(12) United States Patent
Noureddin et al.

(10) Patent No.: US 9,774,510 B2
(45) Date of Patent: Sep. 26, 2017

(54) FACILITATING COLLECTION AND DISPLAY OF INFORMATION RELATED TO DATA USAGE BY A PLURALITY OF MOBILE DEVICES

(71) Applicant: App Annie Inc., San Francisco, CA (US)

(72) Inventors: Sina Koosha Noureddin, Richmond (CA); Eric Eden, Vancouver (CA); Eric MacKinnon, Vancouver (CA)

(73) Assignee: App Annie Inc., San Francisco, CA (US)

( * ) Notice: Subject to any disclaimer, the term of this patent is extended or adjusted under 35 U.S.C. 154(b) by 85 days.

(21) Appl. No.: 14/932,685

(22) Filed: Nov. 4, 2015

(65) Prior Publication Data
US 2016/0127210 A1    May 5, 2016

Related U.S. Application Data
(60) Provisional application No. 62/075,737, filed on Nov. 5, 2014.

(51) Int. Cl.
| | |
|---|---|
| *H04M 11/04* | (2006.01) |
| *H04L 12/26* | (2006.01) |
| *H04M 15/00* | (2006.01) |
| *H04W 8/18* | (2009.01) |

(52) U.S. Cl.
CPC .......... *H04L 43/065* (2013.01); *H04L 43/045* (2013.01); *H04L 43/0876* (2013.01); *H04M 15/61* (2013.01); *H04W 8/186* (2013.01)

(58) Field of Classification Search
CPC ......... H04W 4/24; H04W 24/08; H04W 4/26; H04M 15/80; H04M 15/58; H04M 15/61; H04M 15/00; H04M 2215/0188; H04M 15/66; H04M 15/83; H04M 15/60; H04M 15/7652; H04M 15/43; H04M 15/73; H04M 15/887
USPC ....................................................... 455/405
See application file for complete search history.

(56) References Cited

U.S. PATENT DOCUMENTS

| | | | |
|---|---|---|---|
| 2013/0054378 A1* | 2/2013 | Hao ................... | G06Q 30/0241 705/14.66 |
| 2013/0196615 A1* | 8/2013 | Zalmanovitch ....... | H04W 24/02 455/405 |

* cited by examiner

*Primary Examiner* — Kwasi Karikari
(74) *Attorney, Agent, or Firm* — Fenwick & West LLP

(57) ABSTRACT

A method for facilitating collection and display of information related to data usage by a plurality of mobile devices is disclosed. The method involves receiving first quantity information and sending a first identifier associated with the plurality of mobile devices and first activity-related information including the first quantity information to a server. The method also involves receiving group activity-related information associated with the plurality of mobile devices, the group activity-related information derived at least in part from second activity-related information including second quantity information, and producing signals for causing a display to display information derived from the group activity-related information. A method of associating a plurality of mobile devices in a group is also disclosed. Systems and computer-readable media for facilitating collection and display of information related to data usage by a plurality of mobile devices and for associating a plurality of mobile devices in a group are also disclosed.

26 Claims, 22 Drawing Sheets

Group Member Creation Record

400

- 402 — User Display Name — Sina
- 404 — First Device Display Name — Work Device
- 406 — First Device ID — 11c35...
- 408 — First SIM ID — f16a2...

FIG. 9

Plan Configuration Creation Record

409

- 410 — Communication Type — Mobile
- 412 — Usage Threshold — $10 \times 10^9$
- 414 — Usage Adjustment — $287 \times 10^6$
- 416 — Usage Adjustment Date — 201409200000
- 418 — Interval Count — 1
- 420 — Interval Type — Month
- 422 — Recurrence — True
- 424 — Start — 201409010000
- 420 — Initial Cost — 0
- 422 — Overage Cost — $5 \times 10^{-7}$
- 424 — Coverage Area — 302-720

FIG. 10

Alert Configuration Creation Record     450

| | | |
|---|---|---|
| 452 ~ | Alert Name | Eight_GB_Used |
| 454 ~ | Communication Type | Mobile |
| 456 ~ | Rule Type | absolute_threshold |
| 458 ~ | Threshold | $8 \times 10^9$ |
| 460 ~ | Delivery Method | sms |
| 462 ~ | Interval Count | 1 |
| 464 ~ | Interval Type | Month |
| 466 ~ | Recurrence | True |
| 468 ~ | Start | 201409010000 |

Group Member Record

| | | |
|---|---|---|
| 502 ~ | User ID | 2a17d... |
| 504 ~ | User Display Name | Sina |
| 506 ~ | First Device Display Name | Work Device |
| 508 ~ | First Device ID | 11c35... |
| 510 ~ | First SIM ID | f16a2... |

Activity-related Information Record 1000

| | | |
|---|---|---|
| 1002 ~ | Data Count | $2.3 \times 10^6$ |
| 1004 ~ | Time Period | 2014102712 |
| 1006 ~ | Communication Type | Mobile |
| 1008 ~ | Location | 49.186686, -123.107342 |
| 1010 ~ | Application | com.tripadvisor.tripadvisor |
| 1012 ~ | Battery Usage | 200 |
| 1014 ~ | Device Type | Samsung Galaxy S5 |
| 1016 ~ | Home Operator | Telus |
| 1018 ~ | Serving Operator | Verizon |
| 1020 ~ | OS Identifier | Android 4.4 |

FIG. 20

Identifier Record 1100

| | | |
|---|---|---|
| 1102 ~ | Group ID | BTAVF7 |
| 1104 ~ | Device ID | 11c35... |
| 1106 ~ | SIM ID | f16a2... |

FIG. 21

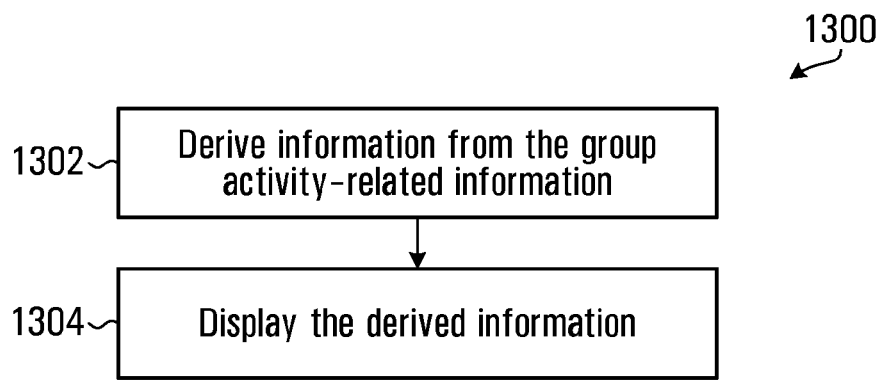
FIG. 23
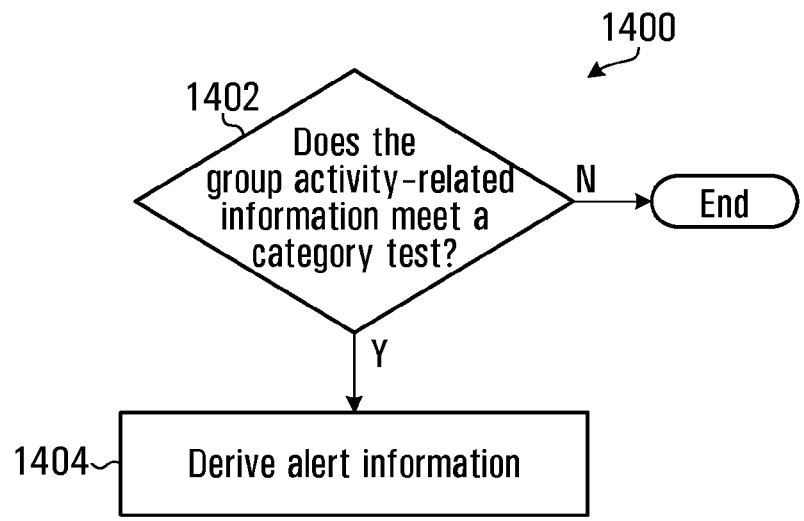
FIG. 24
FIG. 25

Alert Configuration Record 1420

| | |
|---:|:---|
| Alert Name | Eight_GB_Used |
| Communication Type | Mobile |
| Rule Type | absolute_threshold |
| Threshold | $8 \times 10^9$ |
| Delivery Method | sms |
| Interval Count | 1 |
| Interval Type | Month |
| Recurrence | True |
| Start | 201409010000 |

1422

Alert Configuration Record

| | |
|---:|:---|
| Alert Name | Twenty_dollar_alert |
| Communication Type | Mobile |
| Rule Type | cost_threshold |
| Threshold | 20 |
| Delivery Method | email |
| Interval Count | 1 |
| Interval Type | Month |
| Recurrence | True |
| Start | 201409010000 |

Alert Configuration Record

| | |
|---:|:---|
| Alert Name | Ninety_percent |
| Communication Type | Mobile |
| Rule Type | percent_threshold |
| Threshold | 90 |
| Delivery Method | Push |
| Interval Count | 1 |
| Interval Type | Month |
| Recurrence | True |
| Start | 201409010000 |

FIG. 29

Alert Configuration Record — 1600

| | |
|---:|:---|
| Alert Name | Monthly |
| Communication Type | Mobile |
| Rule Type | Time_interval |
| Delivery Method | sms |
| Interval Count | 1 |
| Interval Type | Month |
| Recurrence | True |
| Start | 201409240000 |

FIG. 32

Alert Configuration Record — 1620

| | |
|---:|:---|
| Alert Name | Outside Canada |
| Communication Type | Mobile |
| Rule Type | location |
| Location | Outside Canada |
| Delivery Method | sms |

FIG. 33

Alert Configuration Record

| | |
|---:|:---|
| Alert Name | 6_to_8_pm |
| Communication Type | Mobile |
| Rule Type | Time_use |
| Delivery Method | sms |
| Days | All |
| Time Start | 1800 |
| Time End | 2000 |
| User ID | 1fb2... |

FACILITATING COLLECTION AND DISPLAY OF INFORMATION RELATED TO DATA USAGE BY A PLURALITY OF MOBILE DEVICES

CROSS REFERENCE TO RELATED APPLICATIONS

This application claims the benefit of U.S. Provisional Application No. 62/075,737, filed Nov. 5, 2014, which is incorporated by reference in its entirety.

BACKGROUND

This disclosure relates to a system and method for monitoring and managing wireless data, data usage and data plans, and more particularly, a system and method for facilitating collection and display of information related to data usage by a plurality of mobile devices.

Existing shared data plan subscription models offered by service providers' present challenges for both subscribers and service providers alike. When mobile device users typically subscribe to a shared data plan with a data connection provider (e.g., a telecommunications operator), the shared data plan will have various limitations and costs including data consumption limits and costs associated with use of the mobile devices to transmit or receive wireless data over the connection provided by the data connection provider. Limits and costs can vary from plan to plan, operator to operator, network to network, country to country and access technology to access technology. The data connection may be provided according to various types of access technologies, such as through a 2G, 3G, 4G, or LTE wireless mobile network or a Wi-Fi™ connection, for example.

In view of the limitations and costs placed on mobile device users via their shared data plans, there is generally a need for mobile device users using shared data plans to be able to better understand and monitor their group data use. For example, users may use their understanding of their data use to alter their plan, limit their data use and/or keep data use below data plan thresholds. Some service providers offer data monitoring software to help users track and display their total and/or ongoing data usage throughout a billing cycle or data plan period. However, typical data monitoring systems are generally not capable of effectively monitoring data use over more than one mobile device, which may operate with heterogeneous platforms across one or more networks.

This type of environment where detailed, robust information is not available to a user on a timely basis can result in surprise costs for users (e.g. bill shock). It can also result in costs for the data connection provider as it can lead to increased churn by frustrated users, increased support call costs from misunderstood bills, and/or revenue loss through bill negotiations, for example. Accordingly, there remains a need for improved methods and systems for tracking, interpreting and displaying mobile device-related usage information to both users and service providers for shared data plans.

Data connection providers may also wish to provide users with customized experiences and/or targeted offers. Typical data connection providers may use systems for obtaining information from user feedback or from high level network data and try to take appropriate action based on the obtained information. However, not all users provide feedback to such systems and user feedback obtained by these systems may be incomplete or obtained too late for a provider to take action. Furthermore, systems for analyzing high level network data may not obtain information having sufficient detail for a data connection provider to take action. Accordingly, there remains a need for improved methods and systems for obtaining detailed real time mobile device user information and taking action based on the obtained information by, for example, providing users with a customized experience and/or targeted offers.

SUMMARY OF THE INVENTION

Accordingly, in one illustrative embodiment a method of facilitating collection and display of information related to data usage by a plurality of mobile devices involves receiving at a first mobile device of the plurality of mobile devices, signals representing first quantity information representing a first quantity of data transmitted or received by the first mobile device, and sending to a server from the first mobile device, signals representing a first identifier associated with the plurality of mobile devices and first activity-related information including the first quantity information. The method also involves receiving at the first mobile device, signals representing group activity-related information associated with the plurality of mobile devices, the group activity-related information derived at least in part from second activity-related information including second quantity information representing a second quantity of data transmitted or received by a second mobile device of the plurality of mobile devices, and producing signals for causing a display of the first mobile device to display information derived from the group activity-related information.

The first identifier may include a representation of a group identifier associated with the plurality of mobile devices.

The representation of the group identifier may include a user memorable representation.

The user memorable representation may include an alphanumeric string of 7 or fewer characters.

The method may further involve deriving the information derived from the group activity-related information.

Deriving the information derived from the group activity-related information may involve aggregating at least the first and second quantity information.

Deriving the information derived from the group activity-related information may involve: determining whether the group activity-related information meets a category test, and, if the group activity-related information meets the category test, generating alert information.

The group activity-related information may include the first and second quantity information and determining whether the group activity-related information meets the category test may involve: aggregating at least the first and second quantity information included in the group activity-related information to generate an aggregation, and determining whether the aggregation meets a threshold.

Sending to the server the signals representing the first identifier and the first activity-related information may involve generating first contextual information and the first activity-related data may include the first contextual information and the second activity-related information may include second contextual information.

The group activity-related information may include the first and second contextual information.

The first and second contextual information included in the group activity-related information may include first and second temporal information respectively and determining whether the group activity-related information meets the category test may involve: determining whether at least one of the first and second temporal information included in the group activity-related information falls within a first time period.

The first and second contextual information included in the group activity-related information may include first and second location information respectively and determining whether the group activity-related information meets the category test may involve: determining whether at least one of the first and second location information included in the group activity-related information corresponds to a first location.

The first and second contextual information included in the group activity-related information may include first and second communication type information respectively and determining whether the group activity-related information meets the category test may involve: determining whether at least one of the first and second communication type information included in the group activity-related information corresponds to a first communication type.

The first and second contextual information included in the group activity-related information may include first and second application usage information respectively and determining whether the group activity-related information meets the category test may involve: determining whether at least one of the first and second application usage information included in the group activity-related information corresponds to a first application.

The method may further involve: receiving the first identifier and the first activity-related information, and receiving a second identifier associated with the plurality of mobile devices and the second activity-related information. The method may further involve deriving the group activity-related information from at least the first and second activity-related information, and sending the group activity-related information to the first mobile device.

Deriving the group activity-related information may involve: determining whether the first and second identifiers are associated with the plurality of mobile devices, and deriving the group activity-related information from at least the first and second activity-related information if the first and second identifiers are associated with the plurality of mobile devices.

Determining whether the first and second identifiers are associated with the plurality of mobile devices may involve determining whether the first and second identifiers are associated with a first group identifier associated with the plurality of mobile devices, the first group identifier may be included in a plurality of group identifiers stored in memory, each of the plurality of group identifiers associated with a group of mobile devices.

The method may further involve disassociating at least one of the first and second identifiers from the first group identifier after an initialization time period.

Deriving the group activity-related information may involve aggregating at least the first and second quantity information.

Deriving the group activity-related information may involve: determining whether the first and second activity-related information meet a category test, and if the first and second activity-related information meet the category test generating alert information.

Determining whether the first and second activity-related information meet the category test may involve: aggregating at least the first and second quantity information included in the first and second activity-related information to generate an aggregation, and determining whether the aggregation is greater than a threshold amount.

The first and second activity-related information may involve first and second contextual information.

The first and second contextual information included in the first and second activity-related information may include first and second temporal information respectively and determining whether the first and second activity-related information meet the category test may involve: determining whether at least one of the first and second temporal information included in the first and second activity-related information falls within a first time period.

The first and second contextual information included in the first and second activity-related information may include first and second location information respectively and determining whether the first and second activity-related information meet the category test may involve: determining whether at least one of the first and second location information included in the first and second activity-related information corresponds to a first location.

The first and second contextual information included in the first and second activity-related information may include first and second communication type information respectively and determining whether the first and second activity-related information meet the category test may involve: determining whether at least one of the first and second communication type information included in the first and second activity-related information corresponds to a first communication type.

The first and second contextual information included in the first and second activity-related information may include first and second application usage information respectively and determining whether the first and second activity-related information meet the category test may involve: determining whether at least one of the first and second application usage information included in the first and second activity-related information corresponds to a first application.

In another illustrative embodiment, a method of facilitating collection and display of information related to data usage by a plurality of mobile devices involves receiving first activity-related information from a first mobile device of the plurality of mobile devices, the first activity-related information including a first identifier associated with the plurality of mobile devices and first quantity information representing a first quantity of data transmitted or received by the first mobile device, and receiving second activity-related information from a second mobile device of the plurality of mobile devices, the second activity-related information including a second identifier associated with the plurality of mobile devices and second quantity information representing a second quantity of data transmitted or received by the second mobile device. The method also involves deriving group activity-related information from at least the first and second activity-related information, and sending the group activity-related information to at least one of the first and second mobile devices.

Deriving the group activity-related information may involve determining whether the first and second identifiers are associated with the plurality of mobile devices, and deriving the group activity-related information from at least the first and second activity-related information if the first and second identifiers are associated with the plurality of mobile devices.

Determining whether the first and second identifiers are associated with the plurality of mobile devices may involve: determining whether the first and second identifiers correspond to a first group identifier associated with the plurality of mobile devices, the first group identifier may be included in a plurality of group identifiers stored in memory, each of the plurality of group identifiers associated with a group of mobile devices.

Deriving the group activity-related information may involve aggregating at least the first and second quantity information.

Deriving the group activity-related information may involve determining whether the first and second activity-related information meet a category test, and, if the first and second activity-related information meet the category test, generating alert information.

Determining whether the first and second activity-related information meet the category test may involve aggregating at least the first and second activity-related information to generate an aggregation, and determining whether the aggregation meets a threshold.

The first and second activity-related information may involve first and second contextual information.

The first and second contextual information may include first and second temporal information respectively and determining whether the first and second activity-related information meet the category test may involve determining whether at least one of the first and second temporal information falls within a first time period.

The first and second contextual information may include first and second location information respectively and determining whether the first and second activity-related information meet the category test may involve determining whether at least one of the first and second location information corresponds to a first location.

The first and second contextual information may include first and second communication type information respectively and determining whether the first and second activity-related information meet the category test may involve determining whether at least one of the first and second communication type information corresponds to a first communication type.

The first and second contextual information may include first and second application usage information respectively and determining whether the first and second activity-related information meet the category test may involve determining whether at least one of the first and second application usage information corresponds to a first application.

The method may further involve: receiving the second quantity information at the second mobile device, and sending to the server from the second mobile device the second activity-related information.

In another illustrative embodiment, a computer-readable medium having stored thereon codes which, when executed by at least one processor, cause the at least one processor to perform the above methods.

In another illustrative embodiment, a system for facilitating collection and display of information related to data usage by a plurality of mobile devices includes provisions for receiving at a first mobile device of the plurality of mobile devices, signals representing first quantity information representing a first quantity of data transmitted or received by the first mobile device, and provisions for sending to a server from the first mobile device, signals representing a first identifier associated with the plurality of mobile devices and first activity-related information including the first quantity information. The system also includes provisions for receiving at the first mobile device, signals representing group activity-related information associated with the plurality of mobile devices, the group activity-related information derived at least in part from second activity-related information including second quantity information representing a second quantity of data transmitted or received by a second mobile device of the plurality of mobile devices, and provisions for producing signals for causing a display of the first mobile device to display information derived from the group activity-related information.

The first identifier may include a representation of a group identifier associated with the plurality of mobile devices.

The representation of the group identifier may include a user memorable representation.

The user memorable representation may include an alphanumeric string of 7 or fewer characters.

The system may further include provisions for deriving the information derived from the group activity-related information.

The provisions for deriving the information derived from the group activity-related information may include provisions for aggregating at least the first and second quantity information.

The provisions for deriving the information derived from the group activity-related information may include: provisions for determining whether the group activity-related information meets a category test, and provisions for, if the group activity-related information meets the category test, generating alert information.

The group activity-related information may include the first and second quantity information and the provisions for determining whether the group activity-related information meets the category test may include: provisions for aggregating at least the first and second quantity information included in the group activity-related information to generate an aggregation, and provisions for determining whether the aggregation meets a threshold.

The provisions for sending to the server the signals representing the first identifier and the first activity-related information may include provisions for generating first contextual information and the first activity-related data may include the first contextual information and the second activity-related information may include second contextual information.

The group activity-related information may include the first and second contextual information.

The first and second contextual information included in the group activity-related information may include first and second temporal information respectively and the provisions for determining whether the group activity-related information meets the category test may include: provisions for determining whether at least one of the first and second temporal information included in the group activity-related information falls within a first time period.

The first and second contextual information included in the group activity-related information may include first and second location information respectively and the provisions for determining whether the group activity-related information meets the category test may include: provisions for determining whether at least one of the first and second location information included in the group activity-related information corresponds to a first location.

The first and second contextual information included in the group activity-related information may include first and second communication type information respectively and the provisions for determining whether the group activity-related information meets the category test may include: provisions for determining whether at least one of the first and second communication type information included in the group activity-related information corresponds to a first communication type.

The first and second contextual information included in the group activity-related information may include first and second application usage information respectively and the provisions for determining whether the group activity-related information meets the category test may include: provisions for determining whether at least one of the first and second application usage information included in the group activity-related information corresponds to a first application.

The system may further include: provisions for receiving the first identifier and the first activity-related information, and provisions for receiving a second identifier associated with the plurality of mobile devices and the second activity-related information. The system may further include: provisions for deriving the group activity-related information from at least the first and second activity-related information, and provisions for sending the group activity-related information to the first mobile device.

The provisions for deriving the group activity-related information may involve: provisions for determining whether the first and second identifiers are associated with the plurality of mobile devices, and provisions for deriving the group activity-related information from at least the first and second activity-related information if the first and second identifiers are associated with the plurality of mobile devices.

The provisions for determining whether the first and second identifiers are associated with the plurality of mobile devices may include: provisions for determining whether the first and second identifiers are associated with a first group identifier associated with the plurality of mobile devices, the first group identifier may be included in a plurality of group identifiers stored in memory, each of the plurality of group identifiers associated with a group of mobile devices.

The system may further include provisions for disassociating at least one of the first and second identifiers from the first group identifier after an initialization time period.

The provisions for deriving the group activity-related information may include provisions for aggregating at least the first and second quantity information.

The provisions for deriving the group activity-related information may include: provisions for determining whether the first and second activity-related information meet a category test; and provisions for, if the first and second activity-related information meet the category test generating alert information.

The provisions for determining whether the first and second activity-related information meet the category test may include: provisions for aggregating at least the first and second quantity information included in the first and second activity-related information to generate an aggregation, and provisions for determining whether the aggregation is greater than a threshold amount.

The first and second activity-related information may include first and second contextual information.

The first and second contextual information included in the first and second activity-related information may include first and second temporal information respectively and the provisions for determining whether the first and second activity-related information meet the category test may include: provisions for determining whether at least one of the first and second temporal information included in the first and second activity-related information falls within a first time period.

The first and second contextual information included in the first and second activity-related information may include first and second location information respectively and the provisions for determining whether the first and second activity-related information meet the category test may include: provisions for determining whether at least one of the first and second location information included in the first and second activity-related information corresponds to a first location.

The first and second contextual information included in the first and second activity-related information may include first and second communication type information respectively and the provisions for determining whether the first and second activity-related information meet the category test may include: provisions for determining whether at least one of the first and second communication type information included in the first and second activity-related information corresponds to a first communication type.

The first and second contextual information included in the first and second activity-related information may include first and second application usage information respectively and the provisions for determining whether the first and second activity-related information meet the category test may include: provisions for determining whether at least one of the first and second application usage information included in the first and second activity-related information corresponds to a first application.

In another illustrative embodiment, a system for facilitating collection and display of information related to data usage by a plurality of mobile devices includes provisions for receiving first activity-related information from a first mobile device of the plurality of mobile devices, the first activity-related information including a first identifier associated with the plurality of mobile devices and first quantity information representing a first quantity of data transmitted or received by the first mobile device, and provisions for receiving second activity-related information from a second mobile device of the plurality of mobile devices, the second activity-related information including a second identifier associated with the plurality of mobile devices and second quantity information representing a second quantity of data transmitted or received by the second mobile device. The system also includes provisions for deriving group activity-related information from at least the first and second activity-related information, and provisions for sending the group activity-related information to at least one of the first and second mobile devices.

The provisions for deriving the group activity-related information may include: provisions for determining whether the first and second identifiers are associated with the plurality of mobile devices, and provisions for deriving the group activity-related information from at least the first and second activity-related information if the first and second identifiers are associated with the plurality of mobile devices.

The provisions for determining whether the first and second identifiers are associated with the plurality of mobile devices may include: provisions for determining whether the first and second identifiers correspond to a first group identifier associated with the plurality of mobile devices, the first group identifier may be included in a plurality of group identifiers stored in memory, each of the plurality of group identifiers associated with a group of mobile devices.

The provisions for deriving the group activity-related information may include: provisions for aggregating at least the first and second quantity information.

The provisions for deriving the group activity-related information may include: provisions for determining whether the first and second activity-related information meet a category test, and provisions for, if the first and second activity-related information meet the category test, generating alert information.

The provisions for determining whether the first and second activity-related information meet the category test may include: provisions for aggregating at least the first and second activity-related information to generate an aggregation, and provisions for determining whether the aggregation meets a threshold.

The first and second activity-related information may include first and second contextual information.

The first and second contextual information may include first and second temporal information respectively and the provisions for determining whether the first and second activity-related information meet the category test may include: provisions for determining whether at least one of the first and second temporal information falls within a first time period.

The first and second contextual information may include first and second location information respectively and the provisions for determining whether the first and second activity-related information meet the category test may include: provisions for determining whether at least one of the first and second location information corresponds to a first location.

The first and second contextual information may include first and second communication type information respectively and the provisions for determining whether the first and second activity-related information meet the category test may include: provisions for determining whether at least one of the first and second communication type information corresponds to a first communication type.

The first and second contextual information may include first and second application usage information respectively and the provisions for determining whether the first and second activity-related information meet the category test may include: provisions for determining whether at least one of the first and second application usage information corresponds to a first application.

The system may further include: provisions for receiving the second quantity information at the second mobile device, and provisions for sending to the server from the second mobile device the second activity-related information.

In another illustrative embodiment, a system for facilitating collection and display of information related to data usage by a plurality of mobile devices includes at least one processor. The at least one processor is configured to receive at a first mobile device of the plurality of mobile devices, signals representing first quantity information representing a first quantity of data transmitted or received by the first mobile device, and send to a server from the first mobile device, signals representing a first identifier associated with the plurality of mobile devices and first activity-related information including the first quantity information. The at least one processor is also configured to receive at the first mobile device, signals representing group activity-related information associated with the plurality of mobile devices, the group activity-related information derived at least in part from second activity-related information including second quantity information representing a second quantity of data transmitted or received by a second mobile device of the plurality of mobile devices, and produce signals for causing a display of the first mobile device to display information derived from the group activity-related information.

The first identifier may include a representation of a group identifier associated with the plurality of mobile devices.

The representation of the group identifier may include a user memorable representation.

The user memorable representation may include an alphanumeric string of 7 or fewer characters.

The at least one processor may be configured to derive the information derived from the group activity-related information.

The at least one processor may be configured to derive the information derived from the group activity-related information by aggregating at least the first and second quantity information.

The at least one processor may be configured to derive the information derived from the group activity-related information by: determining whether the group activity-related information meets a category test, and, if the group activity-related information meets the category test, generating alert information.

The group activity-related information may include the first and second quantity information and the at least one processor may be configured to determine whether the group activity-related information meets the category test by: aggregating at least the first and second quantity information included in the group activity-related information to generate an aggregation, and determining whether the aggregation meets a threshold.

The at least one processor may be configured to send to the server the signals representing the first identifier and the first activity-related information by generating first contextual information and the first activity-related data may include the first contextual information and the second activity-related information includes second contextual information.

The group activity-related information may include the first and second contextual information.

The first and second contextual information included in the group activity-related information may include first and second temporal information respectively and the at least one processor may be configured to determine whether the group activity-related information meets the category test by: determining whether at least one of the first and second temporal information included in the group activity-related information falls within a first time period.

The first and second contextual information included in the group activity-related information may include first and second location information respectively and the at least one processor may be configured to determine whether the group activity-related information meets the category test by: determining whether at least one of the first and second location information included in the group activity-related information corresponds to a first location.

The first and second contextual information included in the group activity-related information may include first and second communication type information respectively and the at least one processor may be configured to determine whether the group activity-related information meets the category test by: determining whether at least one of the first and second communication type information included in the group activity-related information corresponds to a first communication type.

The first and second contextual information included in the group activity-related information may include first and second application usage information respectively and the at least one processor may be configured to determine whether the group activity-related information meets the category test by: determining whether at least one of the first and second application usage information included in the group activity-related information corresponds to a first application.

The at least one processor may be configured to: receive the first identifier and the first activity-related information, and receive a second identifier associated with the plurality of mobile devices and the second activity-related information. The at least one processor may also be configured to: derive the group activity-related information from at least the first and second activity-related information, and send the group activity-related information to the first mobile device.

The at least one processor may be configured to derive the group activity-related information by: determining whether the first and second identifiers are associated with the plurality of mobile devices, and deriving the group activity-related information from at least the first and second activity-related information if the first and second identifiers are associated with the plurality of mobile devices.

The at least one processor may be configured to determine whether the first and second identifiers are associated with the plurality of mobile devices by: determining whether the first and second identifiers are associated with a first group identifier associated with the plurality of mobile devices, the first group identifier may be included in a plurality of group identifiers stored in memory, each of the plurality of group identifiers associated with a group of mobile devices.

The at least one processor may be configured to disassociate at least one of the first and second identifiers from the first group identifier after an initialization time period.

The at least one processor may be configured to derive the group activity-related information by aggregating at least the first and second quantity information.

The at least one processor may be configured to derive the group activity-related information by: determining whether the first and second activity-related information meet a category test; if the first and second activity-related information meet the category test generating alert information.

The at least one processor may be configured to determine whether the first and second activity-related information meet the category test by: aggregating at least the first and second quantity information included in the first and second activity-related information to generate an aggregation, and determining whether the aggregation is greater than a threshold amount.

The first and second activity-related information may include first and second contextual information.

The first and second contextual information included in the first and second activity-related information may include first and second temporal information respectively and the at least one processor may be configured to determine whether the first and second activity-related information meet the category test by: determining whether at least one of the first and second temporal information included in the first and second activity-related information falls within a first time period.

The first and second contextual information included in the first and second activity-related information may include first and second location information respectively and the at least one processor may be configured to determine whether the first and second activity-related information meet the category test by: determining whether at least one of the first and second location information included in the first and second activity-related information corresponds to a first location.

The first and second contextual information included in the first and second activity-related information may include first and second communication type information respectively and the at least one processor may be configured to determine whether the first and second activity-related information meet the category test by: determining whether at least one of the first and second communication type information included in the first and second activity-related information corresponds to a first communication type.

The first and second contextual information included in the first and second activity-related information may include first and second application usage information respectively and the at least one processor may be configured to determine whether the first and second activity-related information meet the category test by: determining whether at least one of the first and second application usage information included in the first and second activity-related information corresponds to a first application.

In another illustrative embodiment, a system for facilitating collection and display of information related to data usage by a plurality of mobile devices includes at least one processor. The at least one processor is configured to receive first activity-related information from a first mobile device of the plurality of mobile devices, the first activity-related information including a first identifier associated with the plurality of mobile devices and first quantity information representing a first quantity of data transmitted or received by the first mobile device, and receive second activity-related information from a second mobile device of the plurality of mobile devices, the second activity-related information including a second identifier associated with the plurality of mobile devices and second quantity information representing a second quantity of data transmitted or received by the second mobile device. The at least one processor is also configured to derive group activity-related information from at least the first and second activity-related information, and send the group activity-related information to at least one of the first and second mobile devices.

The at least one processor may be configured to derive the group activity-related information by: determining whether the first and second identifiers are associated with the plurality of mobile devices, and deriving the group activity-related information from at least the first and second activity-related information if the first and second identifiers are associated with the plurality of mobile devices.

The at least one processor may be configured to determine whether the first and second identifiers are associated with the plurality of mobile devices may include: determining whether the first and second identifiers correspond to a first group identifier associated with the plurality of mobile devices, the first group identifier may be included in a plurality of group identifiers stored in memory, each of the plurality of group identifiers associated with a group of mobile devices.

The at least one processor may be configured to derive the group activity-related information may include: aggregating at least the first and second quantity information.

The at least one processor may be configured to derive the group activity-related information by: determining whether the first and second activity-related information meet a category test, and, if the first and second activity-related information meet the category test, generating alert information.

The at least one processor may be configured to determine whether the first and second activity-related information meet the category test by: aggregating at least the first and second activity-related information to generate an aggregation, and determining whether the aggregation meets a threshold.

The first and second activity-related information may include first and second contextual information.

The first and second contextual information may include first and second temporal information respectively and the at least one processor may be configured to determine whether the first and second activity-related information meet the category test by: determining whether at least one of the first and second temporal information falls within a first time period.

The first and second contextual information may include first and second location information respectively and the at least one processor may be configured to determine whether the first and second activity-related information meet the category test by: determining whether at least one of the first and second location information corresponds to a first location.

The first and second contextual information may include first and second communication type information respectively and the at least one processor may be configured to determine whether the first and second activity-related information meet the category test by: determining whether at least one of the first and second communication type information corresponds to a first communication type.

The first and second contextual information may include first and second application usage information respectively and the at least one processor may be configured to determine whether the first and second activity-related information meet the category test by: determining whether at least one of the first and second application usage information corresponds to a first application.

The at least one processor may be configured to: receive the second quantity information at the second mobile device, and send to the server from the second mobile device the second activity-related information.

In another illustrative embodiment, a method of associating a plurality of mobile devices in a group involves receiving group creation information including a first group member identifier associated with a first mobile device of the plurality of mobile devices, and sending the group creation information to a server to cause the server to store group information derived from the group creation information in association with a group identifier. The method also involves receiving from the server a representation of the group identifier and producing signals for causing a display of a device to display the representation of the group identifier for dissemination amongst the plurality of mobile devices.

The method may further involve: receiving at a second mobile device included in the plurality of mobile devices, the representation of the group identifier; and sending to the server from the second mobile device, the representation of the group identifier and a second group member identifier associated with the second mobile device, to cause the server to store the second group member identifier in association with the group identifier.

The method may further involve: receiving the group creation information including the first group member identifier, generating the group identifier, and storing information derived from the group creation information in association with the group identifier. The method may further involve: sending a representation of the group identifier to the first mobile device for dissemination amongst the plurality of mobile devices, receiving from the second mobile device, the representation of the group identifier and the second group member identifier, and storing the second group member identifier in association with the group identifier.

The representation of the group identifier may include a user memorable representation.

The user memorable representation may include an alphanumeric string of 7 or fewer characters.

Sending the representation of the group identifier to the first mobile device may involve associating the representation of the group identifier with the group identifier and the method may further involve disassociating the representation of the group identifier from the group identifier after an initialization time period.

The group creation information may include plan configuration information.

In another illustrative embodiment, a method of associating a plurality of mobile devices in a group involves receiving group characteristic information associated with the group, receiving a first group member identifier associated with a first mobile device of the plurality of mobile devices, and generating a group identifier. The method also involves storing the first group member identifier and the group characteristic information in association with the group identifier, and producing signals for causing a display of a device to display a representation of the group identifier for dissemination amongst the plurality of mobile devices. The method also involves receiving from a second mobile device included in the plurality of mobile devices, the representation of the group identifier and a second group member identifier associated with the second mobile device, and storing the second group member identifier in association with the group identifier to associate the second mobile device with the group.

The representation of the group identifier may include a user memorable representation.

The user memorable representation may include an alphanumeric string of 7 or fewer characters.

Sending the representation of the group identifier to the first mobile device may involve associating the representation of the group identifier with the group identifier and the method may further involve disassociating the representation of the group identifier from the group identifier after an initialization time period.

In another illustrative embodiment, a computer-readable medium having stored thereon codes which, when executed by at least one processor, cause the at least one processor to perform the above methods.

In another illustrative embodiment, a system for associating a plurality of mobile devices in a group includes provisions for receiving group creation information including a first group member identifier associated with a first mobile device of the plurality of mobile devices. The system also includes provisions for sending the group creation information to a server to cause the server to store group information derived from the group creation information in association with a group identifier, and provisions for receiving from the server a representation of the group identifier and producing signals for causing a display of a device to display the representation of the group identifier for dissemination amongst the plurality of mobile devices.

The system may further include: provisions for receiving at a second mobile device included in the plurality of mobile devices, the representation of the group identifier, and provisions for sending to the server from the second mobile device, the representation of the group identifier and a second group member identifier associated with the second mobile device, to cause the server to store the second group member identifier in association with the group identifier.

The system may further include: provisions for receiving the group creation information including the first group member identifier, provisions for generating the group identifier, and provisions for storing information derived from the group creation information in association with the group identifier. The system may further include: provisions for sending a representation of the group identifier to the first mobile device for dissemination amongst the plurality of mobile devices, provisions for receiving from the second mobile device, the representation of the group identifier and the second group member identifier, and provisions for storing the second group member identifier in association with the group identifier.

The representation of the group identifier may include a user memorable representation.

The user memorable representation may include an alphanumeric string of 7 or fewer characters.

The provisions for sending the representation of the group identifier to the first mobile device may include provisions for associating the representation of the group identifier with the group identifier and the system may further include provisions for disassociating the representation of the group identifier from the group identifier after an initialization time period.

The group creation information may include plan configuration information.

In another illustrative embodiment, a system for associating a plurality of mobile devices in a group includes provisions for receiving group characteristic information associated with the group, provisions for receiving a first group member identifier associated with a first mobile device of the plurality of mobile devices, and provisions for generating a group identifier. The system also includes provisions for storing the first group member identifier and the group characteristic information in association with the group identifier, and provisions for producing signals for causing a display of a device to display a representation of the group identifier for dissemination amongst the plurality of mobile devices. The system also includes provisions for receiving from a second mobile device included in the plurality of mobile devices, the representation of the group identifier and a second group member identifier associated with the second mobile device, and storing the second group member identifier in association with the group identifier to associate the second mobile device with the group.

The representation of the group identifier may include a user memorable representation.

The user memorable representation may include an alphanumeric string of 7 or fewer characters.

The provisions for sending the representation of the group identifier to the first mobile device may include provisions for sending associating the representation of the group identifier with the group identifier and the system may further include provisions for sending disassociating the representation of the group identifier from the group identifier after an initialization time period.

In accordance with another illustrative embodiment, a system for associating a plurality of mobile devices in a group includes at least one processor. The at least one processor is configured to receive group creation information including a first group member identifier associated with a first mobile device of the plurality of mobile devices. The at least one processor is also configured to send the group creation information to a server to cause the server to store group information derived from the group creation information in association with a group identifier, and receive from the server a representation of the group identifier and producing signals for causing a display of a device to display the representation of the group identifier for dissemination amongst the plurality of mobile devices.

The at least one processor may be configured to: receive at a second mobile device included in the plurality of mobile devices, the representation of the group identifier, and send to the server from the second mobile device, the representation of the group identifier and a second group member identifier associated with the second mobile device, to cause the server to store the second group member identifier in association with the group identifier.

The at least one processor may be configured to: receive the group creation information including the first group member identifier, generate the group identifier, and store information derived from the group creation information in association with the group identifier. The at least one processor may be configured to send a representation of the group identifier to the first mobile device for dissemination amongst the plurality of mobile devices, receive from the second mobile device, the representation of the group identifier and the second group member identifier, and store the second group member identifier in association with the group identifier.

The representation of the group identifier may include a user memorable representation.

The user memorable representation may include an alphanumeric string of 7 or fewer characters.

The at least one processor may be configured to send the representation of the group identifier to the first mobile device by associating the representation of the group identifier with the group identifier and wherein the at least one processor is configured to disassociate the representation of the group identifier from the group identifier after an initialization time period.

The group creation information may include plan configuration information.

In another illustrative embodiment, a system for associating a plurality of mobile devices in a group includes at least one processor. The at least one processor is configured to receive group characteristic information associated with the group, receive a first group member identifier associated with a first mobile device of the plurality of mobile devices, and generate a group identifier. The at least one processor is also configured to store the first group member identifier and the group characteristic information in association with the group identifier, and produce signals for causing a display of a device to display a representation of the group identifier for dissemination amongst the plurality of mobile devices. The at least one processor is also configured to receive from a second mobile device included in the plurality of mobile devices, the representation of the group identifier and a second group member identifier associated with the second mobile device, and store the second group member identifier in association with the group identifier to associate the second mobile device with the group.

The representation of the group identifier may include a user memorable representation.

The user memorable representation may include an alphanumeric string of 7 or fewer characters.

The at least one processor may be configured to send the representation of the group identifier to the first mobile device by associating the representation of the group identifier with the group identifier and wherein the at least one processor is configured to disassociate the representation of the group identifier from the group identifier after an initialization time period.

In another illustrative embodiment, a method of facilitating collection and display of information related to data usage by a plurality of mobile devices involves receiving group creation information including a first group member identifier associated with a first mobile device of the plurality of mobile devices. The method also involves sending the group creation information to a server to cause the server to store group information derived from the group creation information in association with a group identifier, receiving from the server a representation of the group identifier and producing signals for causing a display of a device to display the representation of the group identifier for dissemination amongst the plurality of mobile devices, and receiving signals representing first quantity information representing a first quantity of data transmitted or received by the first mobile device. The method also involves sending to the server from the first mobile device, signals representing a first identifier associated with the group identifier and first activity-related information including the first quantity information, receiving at the first mobile device, signals representing group activity-related information associated with the plurality of mobile devices, the group activity-related information derived at least in part from second activity-related information including second quantity information representing a second quantity of data transmitted or received by a second mobile device of the plurality of mobile devices, and producing signals for causing a display of the first mobile device to display information derived from the group activity-related information.

In another illustrative embodiment, a method of facilitating collection and display of information related to data usage by a plurality of mobile devices involves receiving group characteristic information associated with the plurality of mobile devices, receiving a first group member identifier associated with a first mobile device of the plurality of mobile devices, and generating a group identifier. The method also involves storing the first group member identifier and the group characteristic information in association with the group identifier, producing signals for causing a display of a device to display a representation of the group identifier for dissemination amongst the plurality of mobile devices, and receiving from a second mobile device included in the plurality of mobile devices, the representation of the group identifier and a second group member identifier associated with the second mobile device. The method also involves storing the second group member identifier in association with the group identifier to associate the second mobile device with the group, and receiving first activity-related information from the first mobile device, the first activity-related information including a first identifier representing the group identifier and first quantity information representing a first quantity of data transmitted or received by the first mobile device. The method also involves receiving second activity-related information from the second mobile device, the second activity-related information including a second identifier representing the group identifier and second quantity information representing a second quantity of data transmitted or received by the second mobile device, deriving group activity-related information from at least the first and second activity-related information, and sending the group activity-related information to at least one of the first and second mobile devices.

In another illustrative embodiment, a computer-readable medium having stored thereon codes which, when executed by at least one processor, cause the at least one processor to perform the above methods.

In another illustrative embodiment, a system for facilitating collection and display of information related to data usage by a plurality of mobile devices includes provisions for receiving group creation information including a first group member identifier associated with a first mobile device of the plurality of mobile devices. The system also includes provisions for sending the group creation information to a server to cause the server to store group information derived from the group creation information in association with a group identifier, provisions for receiving from the server a representation of the group identifier and producing signals for causing a display of a device to display the representation of the group identifier for dissemination amongst the plurality of mobile devices, and provisions for receiving signals representing first quantity information representing a first quantity of data transmitted or received by the first mobile device. The system also includes provisions for sending to the server from the first mobile device, signals representing a first identifier associated with the group identifier and first activity-related information including the first quantity information, provisions for receiving at the first mobile device, signals representing group activity-related information associated with the plurality of mobile devices, the group activity-related information derived at least in part from second activity-related information including second quantity information representing a second quantity of data transmitted or received by a second mobile device of the plurality of mobile devices, and provisions for producing signals for causing a display of the first mobile device to display information derived from the group activity-related information.

In another illustrative embodiment, a system for facilitating collection and display of information related to data usage by a plurality of mobile devices includes provisions for receiving group characteristic information associated with the plurality of mobile devices, provisions for receiving a first group member identifier associated with a first mobile device of the plurality of mobile devices, and provisions for generating a group identifier. The system also includes provisions for storing the first group member identifier and the group characteristic information in association with the group identifier, provisions for producing signals for causing a display of a device to display a representation of the group identifier for dissemination amongst the plurality of mobile devices, and provisions for receiving from a second mobile device included in the plurality of mobile devices, the representation of the group identifier and a second group member identifier associated with the second mobile device. The system also includes provisions for storing the second group member identifier in association with the group identifier to associate the second mobile device with the group, and provisions for receiving first activity-related information from the first mobile device, the first activity-related information including a first identifier representing the group identifier and first quantity information representing a first quantity of data transmitted or received by the first mobile device. The system also includes provisions for receiving second activity-related information from the second mobile device, the second activity-related information including a second identifier representing the group identifier and second quantity information representing a second quantity of data transmitted or received by the second mobile device, provisions for deriving group activity-related information from at least the first and second activity-related information, and provisions for sending the group activity-related information to at least one of the first and second mobile devices.

In another illustrative embodiment, a system for facilitating collection and display of information related to data usage by a plurality of mobile devices includes at least one processor. The at least one processor is configured to receive group creation information including a first group member identifier associated with a first mobile device of the plurality of mobile devices, send the group creation information to a server to cause the server to store group information derived from the group creation information in association with a group identifier, and receive from the server a representation of the group identifier and producing signals for causing a display of a device to display the representation of the group identifier for dissemination amongst the plurality of mobile devices. The at least one processor is configured to receive signals representing first quantity information representing a first quantity of data transmitted or received by the first mobile device, and send to the server from the first mobile device, signals representing a first identifier associated with the group identifier and first activity-related information including the first quantity information. The at least one processor is also configured to receive at the first mobile device, signals representing group activity-related information associated with the plurality of mobile devices, the group activity-related information derived at least in part from second activity-related information including second quantity information representing a second quantity of data transmitted or received by a second mobile device of the plurality of mobile devices, and produce signals for causing a display of the first mobile device to display information derived from the group activity-related information.

In another illustrative embodiment, a system for facilitating collection and display of information related to data usage by a plurality of mobile devices includes at least one processor. The at least one processor is configured to receive group characteristic information associated with the plurality of mobile devices, receive a first group member identifier associated with a first mobile device of the plurality of mobile devices, and generate a group identifier. The at least one processor is also configured to store the first group member identifier and the group characteristic information in association with the group identifier, produce signals for causing a display of a device to display a representation of the group identifier for dissemination amongst the plurality of mobile devices, and receive from a second mobile device included in the plurality of mobile devices, the representation of the group identifier and a second group member identifier associated with the second mobile device. The at least one processor is also configured to store the second group member identifier in association with the group identifier to associate the second mobile device with the group, and receive first activity-related information from the first mobile device, the first activity-related information including a first identifier representing the group identifier and first quantity information representing a first quantity of data transmitted or received by the first mobile device. The at least one processor is also configured to receive second activity-related information from the second mobile device, the second activity-related information including a second identifier representing the group identifier and second quantity information representing a second quantity of data transmitted or received by the second mobile device, derive group activity-related information from at least the first and second activity-related information, and send the group activity-related information to at least one of the first and second mobile devices.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 9 is a representation of an exemplary group member creation record that may be used in the system shown in FIG. 1;

FIG. 10 is a representation of an exemplary plan configuration creation record that may be used in the system shown in FIG. 1;

FIG. 20 is a representation of an exemplary activity-related information record that may be used in the system shown in FIG. 1;

FIG. 21 is a representation of an exemplary identifier record that may be used in the system shown in FIG. 1;

FIG. 23 is a representation of a block of code that in various embodiments may be included in the flowchart shown in FIG. 4;

FIG. 24 is a flowchart depicting blocks of code for directing the first mobile device processor of the first mobile device shown in FIG. 2 to facilitate displaying information derived from the group activity-related information in accordance with various embodiments of the invention;

FIG. 25 is a flowchart depicting blocks of code for directing the first mobile device processor of the first mobile device shown in FIG. 2 to facilitate deriving alert information from the group activity-related information in accordance with various embodiments of the invention;

FIG. 28 is a representation of an exemplary alert configuration record that may be used in the system shown in FIG. 1;

FIG. 29 is a representation of an exemplary alert configuration record that may be used in the system shown in FIG. 1;

FIG. 32 is a representation of an exemplary alert configuration record that may be used in the system shown in FIG. 1;

FIG. 33 is a representation of an exemplary alert configuration record that may be used in the system shown in FIG. 1;

FIG. 34 is a representation of an exemplary alert configuration record that may be used in the system shown in FIG. 1.

DETAILED DESCRIPTION

Figure 1:
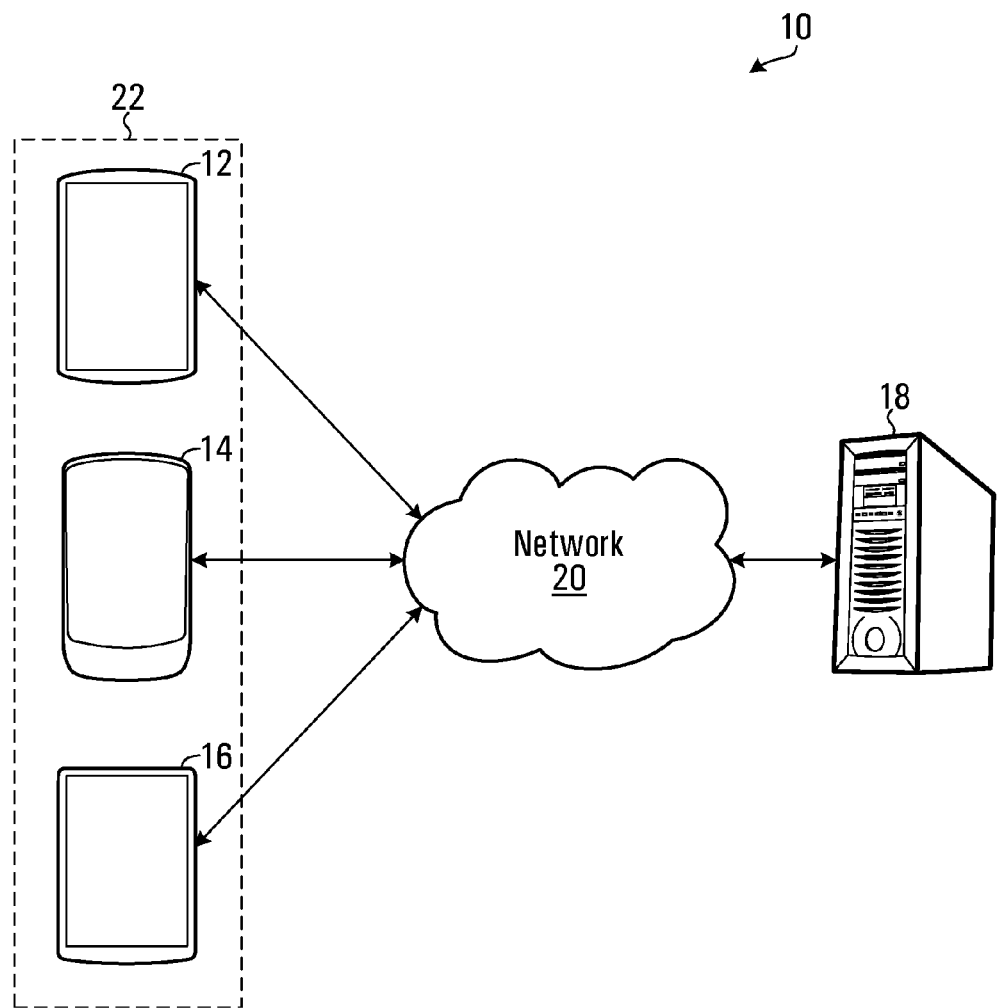
FIG. 1 is a schematic view of a system for facilitating collection and display of information related to data usage by a plurality of mobile devices in accordance with various embodiments of the invention.

Aspects, features and embodiments of the invention are described with reference to illustrative embodiments and figures.

As used herein the term "server" can refer to any computing unit or entity that provides content, data or services over a network to one or more clients. The term "data" refers to any representation of information that serves as either input to or output from a computer. As used herein, the term "module" refers to an identifiable part of a system with well-defined functionality and interface capability to other modules. Modules can include software modules that are part of a software system with well-defined sub-functionality. Modules can also include, but are not limited to software blocks, component units and/or subsystems.

As used herein, the term "intermediary" refers to a computing node. The intermediary could be, by way of example, a proxy server or a dedicated application server. In certain embodiments described below, a proxy server can be used as an intermediary, although, the embodiments of the invention can also be implemented on other types of intermediaries. In various embodiments the invention described herein is generally independent of any particular intermediary.

As used herein, "a processor" may include one or more processing units.

Generally, there is provided a method, system and apparatus for facilitating collection and display of information related to data usage by a plurality of mobile devices.

In the first embodiment, a mobile client app such as a shared plan management application is installed and running on subscriber mobile devices, where the shared plan management app monitors and selectively intercepts and captures localized device and application activity-related information (also referred to herein as "activity-related information") associated with a corresponding user or mobile subscriber and the one or more mobile devices of that user. The shared plan management app can comprise one or more modules configured to operate on the mobile device in cooperation with an operating system ("O/S") installed on the device. In various embodiments, the shared plan management app may help to provide data usage tracking functionality to wireless subscribers to help them understand and manage their data consumption and related mobile device usage and application activities. The shared plan management app may selectively process portions of the captured activity-related data before transmitting the captured data to the server for further automated processing.

In various embodiments, data captured by the shared plan management app may be stored and/or processed to better track and manage how users or group members make use of their data plans, and with the support of the computer server, the shared plan management app may be capable of facilitating real-time or "near real-time" data plan usage alerts, notifications and/or information. The shared plan management app may, for example, be configured to provide both general usage alerts and information relating to overall data plan usage (including by type of connection, time period, battery usage, and location, for example), as well as more granular usage alerts and information relating to usage on a per-application basis, for example, so that users can be better informed of specific types of activities or applications that may be consuming significant portions of the data plan within any particular plan period, while reducing the risk of bill shock and unexpected overages.

In various embodiments, the user may then be able to more readily adapt their mobile device and application-related activities as well as those of their other group members in an effort to remain within data plan usage limits for any particular plan period.

In various embodiments, the shared plan management app may help to provide ongoing and real-time monitoring of a user's or a group of user's data usage, including activity-related information behavior over any period of time (over hours, days, months, plan periods or the like). For example, in some embodiments, the shared plan management app may automatically identify an interface or communication type (Wi-Fi™, mobile, roaming) associated with particular data communications and may facilitate maintaining a history of the user's and the group's usage patterns for each of these interfaces. In various embodiments, the app may also or alternatively be configured to track mobile and roaming usage separately for each SIM that a subscriber may use, so that a complete and accurate picture of usage is maintained for the subscriber across all devices and service providers.

In various embodiments, the shared plan management app may be configured to monitor and track temporally a variety of application-related activities on the mobile device including which application is open during a particular time period, for example.

Referring to FIG. 1, according to one embodiment of the invention, there is provided a system 10 for facilitating collection and display of information related to data usage by a plurality of mobile devices. The system 10 includes a plurality of mobile devices, which in the embodiment shown includes first, second, and third mobile devices 12, 14, and 16, which act as networked devices and are in communication with a network 20 via a wireless connection using any of a variety of communication standards. In the embodiment shown in FIG. 1, the first, second and third mobile devices 12, 14, and 16 are shown for illustrative purposes, but in various embodiments, the system 10 may include other mobile devices, including more or fewer mobile devices.

In various embodiments, the first, second, and third mobile devices 12, 14, and 16 may be in communication with the network 20 via a cellular network using 2G, 3G, 4G or another communications standard. The mobile devices 12, 14, and 16 may communicate with one another and/or to other devices over the network 20.

Communication over the network 20 by the mobile devices 12, 14, and 16 may be enabled by a data connection provider which may associate the first, second, and third mobile devices 12, 14, and 16 together as a group 22 of mobile devices. The data connection provider may associate the group 22 of mobile devices with a shared data plan defining limits and costs associated with data use by the group 22 of mobile devices over the network 20. For example, in various embodiments (not shown), the data connection provider may provide a connection and monitor data use by the group 22 of mobile devices over the network 20 using an intermediary interposed between the devices and the network 20 and the data connection provider may charge users of the mobile devices 12, 14, and 16 according to monitored data use and an associated shared data plan.

The system 10 also includes a server 18 in communication with the mobile devices 12, 14, and 16. In the embodiment shown, the server 18 is in communication with the mobile devices 12, 14, and 16 via the network 20.

Processor Circuit—First Mobile Device

Figure 2:
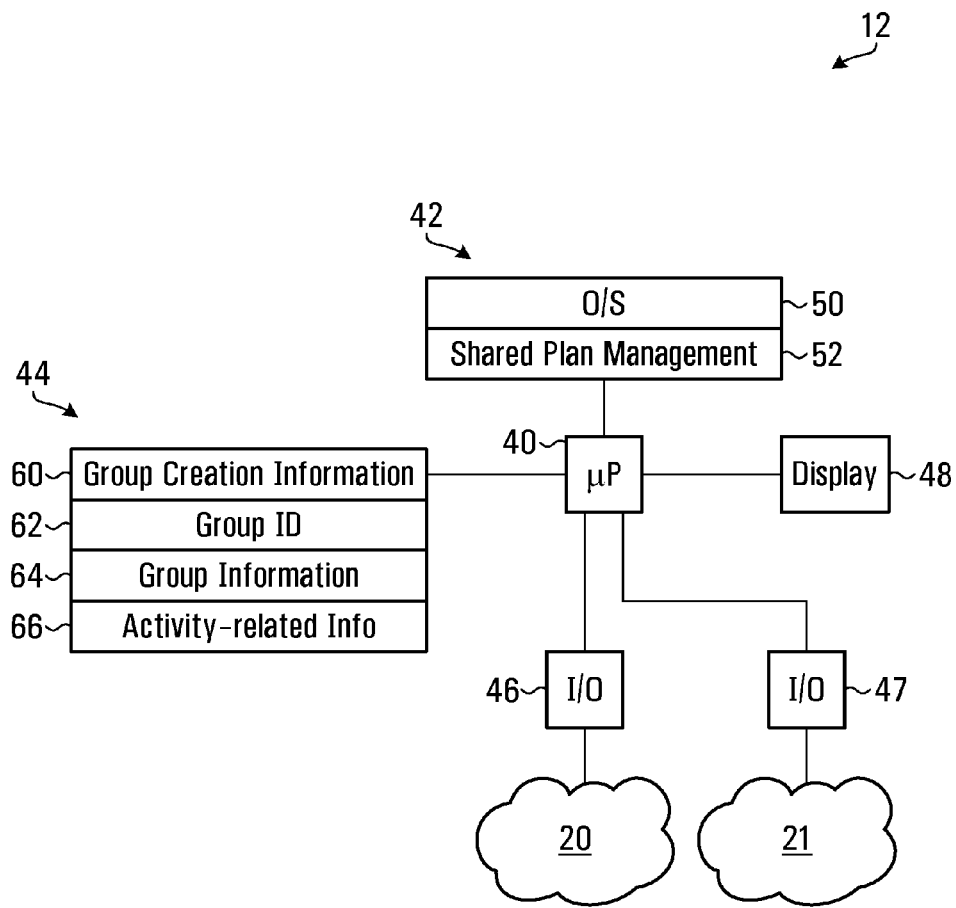
FIG. 2 is a schematic view of a processor circuit for implementing a first mobile device shown in the system of FIG. 1 in accordance with various embodiments of the invention.

Referring to FIG. 2, a schematic view of a processor circuit for implementing the first mobile device 12 according to one embodiment is shown. In various embodiments, the first mobile device 12 may include any of a variety of computing devices including a smartphone, a tablet, a phablet, a personal digital assistant, a cellular phone, a laptop, a notebook, a wearable computing device such as Google Glass™ or wireless watches and the like, an embedded mobile device which may be embedded in a vehicle such as an automobile or a plane, for example, or another form of mobile computing device capable of wireless communication via one or more networks.

In the embodiment shown, the first mobile device 12 includes a first mobile device processor 40, a program memory 42, a variable memory 44, a first input/output (I/O) interface 46, a second input/output (I/O) interface 47, and a display 48, which in various embodiments may be a touch sensitive display.

In the embodiment shown in FIG. 2, the program memory 42 and the variable memory 44 are included as part of the first mobile device 12. In various embodiments, the program memory 42, the variable memory 44, or both may be separate from the first mobile device 12 and may be in communication with the first mobile device processor 40 through a network over at least one of the I/O interfaces 46 and 47, for example. In various embodiments the first and second I/O interfaces 46 and 47 each enable a wireless connection such as a cellular network connection, a Wi-Fi™ connection, a WiMAX™ connection, a Bluetooth connection or another form of wireless connection. In the embodiment shown, the first I/O interface 46 enables a cellular network connection to the network 20 and the second I/O interface 47 enables a Wi-Fi™ connection to a network 21, which may in various embodiments, be in communication with the network 20.

Program codes for directing the first mobile device processor 40 to carry out various functions are stored in the program memory 42, which may be implemented as one or more storage devices including random access memory (RAM), a hard disk drive (HDD), a network drive, flash memory, a memory stick or card, any other form of computer-readable memory or storage medium, and/or a combination thereof The program memory 42 includes a block of codes 50 for directing the first mobile device 12 to effect operating system functions and a block of codes 52 for directing the first mobile device 12 to effect shared plan management application functions.

The variable memory 44 includes a plurality of storage locations including location 60 for storing group creation information, location 62 for storing at least one representation of a group identifier, location 64 for storing group information, and location 66 for storing activity-related information. In various embodiments, the plurality of storage locations may be stored in a database in the variable memory 44.

In various embodiments, the variable memory 44 may be implemented as any type of writeable memory. For example, in various embodiments, the variable memory 44 may be implemented as one or more storage devices including RAM, a HDD, a network drive, flash memory, a memory stick or card, any other form of computer-readable memory or storage medium and/or a combination thereof.

In various embodiments, such as where the display 48 shown in FIG. 2 is not a touch screen display, the first mobile device 12 may include input devices, such as, for example, a keyboard and/or a pointing device, such as a mouse.

Processor Circuit—Second Mobile Device

In various embodiments, the second and third mobile devices 14 and 16 shown in FIG. 1 may be implemented generally similarly to the first mobile device 12, described above and shown in FIG. 2.

Figure 3:
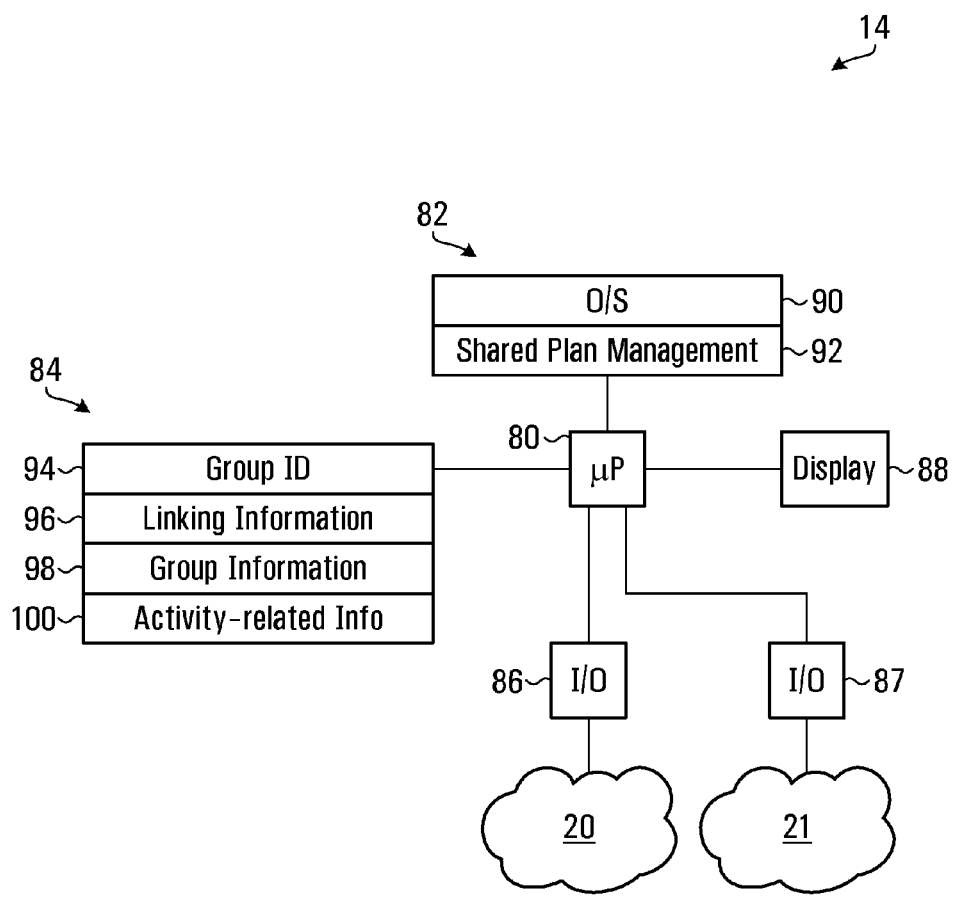
FIG. 3 is a schematic view of a processor circuit for implementing a second mobile device shown in the system of FIG. 1 in accordance with various embodiments of the invention.

Referring to FIG. 3, a schematic view of a processor circuit for implementing the second mobile device 14 according to one embodiment is shown. The second mobile device 14 includes a second mobile device processor 80, a program memory 82, a variable memory 84, a first input/output (I/O) interface 86 in communication with the network 20, a second input/output (I/O) interface 87 in communication with the network 21, and a display 88, which in various embodiments may be a touch sensitive display.

The program memory 82 includes a block of codes 90 for directing the second mobile device 14 to effect operating system functions. In various embodiments, the block of codes 90 may effect a different operating system from that effected by the block of codes 50 shown in FIG. 2. The program memory 82 also includes a block of codes 92 for directing the first mobile device 12 to effect shared plan management application functions.

The variable memory 84 includes a plurality of storage locations including location 94 for storing at least one representation of a group identifier, location 96 for storing linking information, a location 98 for storing group information, and location 100 for storing activity-related information.

Processor Circuit—Server

The server comprises a mobile subscriber service management system ("MSSM system") which cooperates with one or more databases to store activity-related information. In various embodiments, the server may be configured to analyze, compile, defragment and/or coalesce activity-related information received from each device via a shared plan management application.

In various embodiments, the mobile subscriber service management system may provide an extendible platform to operators enabling them to customize user alerts or notifications, offerings and/or promotions with context-triggered data and events based on the activity-related information that the server receives and analyzes from shared plan management apps running on mobile devices. In various embodiments, with the advantage of the MSSM system and shared plan management apps capable of cooperating to exchange activity-related data in real-time across a plurality of networks, the system may be able to rapidly identify when a device or application-related activity of any particular user, group member, or group of users on one or more mobile devices meets certain predetermined category tests or activity-related thresholds managed by the system. In various embodiments, with context-specific, device-specific, user-specific, time-specific, location-specific and/or application-specific activities, for example, and related temporal data tracked by the shared plan management application and the server in real-time, the system may be able to identify a multitude of different alerts, notifications, offerings and/or promotions to be displayed for one or more applicable users within a group of users.

Figure 4:
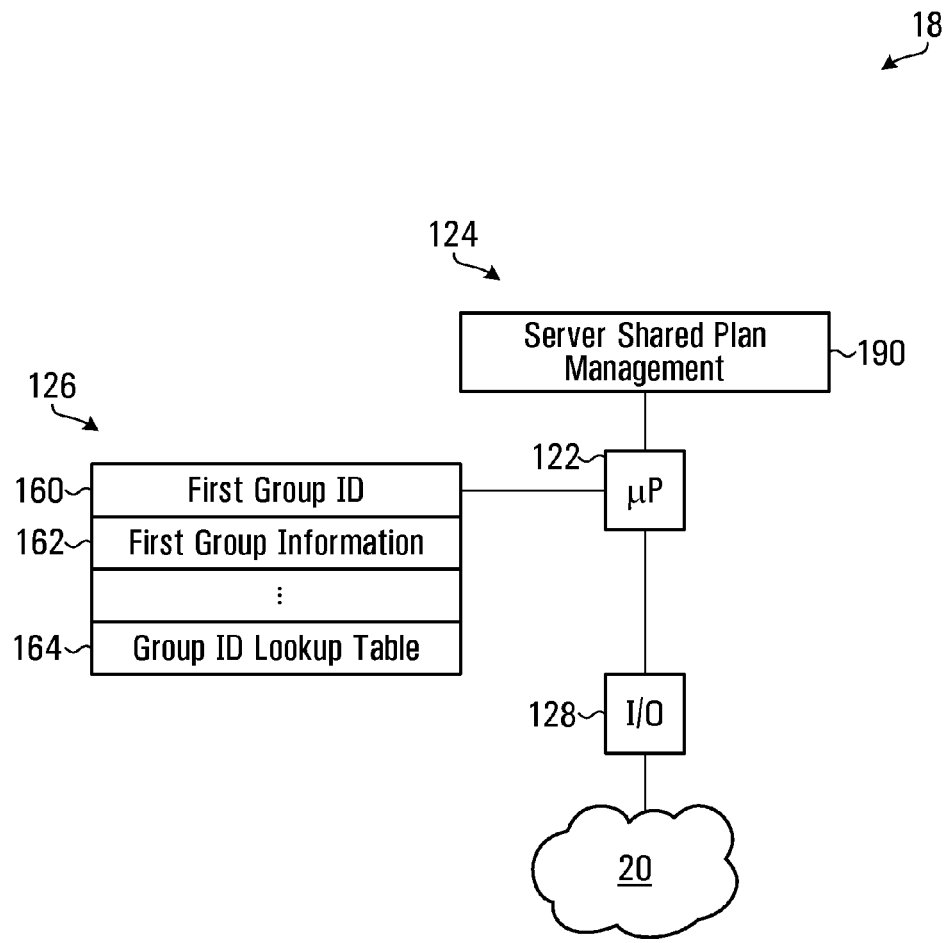
FIG. 4 a schematic view of a processor circuit for implementing a server shown in the system of FIG. 1 in accordance with various embodiments of the invention.

Referring to FIG. 4, a schematic view of a processor circuit for implementing the server 18 in accordance with one embodiment, is shown. The server 18 includes a server processor 122, a program memory 124, a variable memory 126, and an I/O interface 128, all of which are in communication with the server processor. The I/O interface 128 may include a network interface having a network interface card with an input/output for connecting to the network 20, and through which communications may be conducted with devices connected to the network 20, such as the first, second, and third mobile devices 12, 14, and 16.

In the embodiment shown in FIG. 4, the program memory 124 and the variable memory 126 are included as part of the processor circuit. In various other embodiments, the program memory 124, the variable memory 126, or both may be separate from the processor circuit and may be in communication with the server processor 122, via the network 20 through the I/O interface 128, for example.

In various embodiments, program codes for directing the server processor 122 to carry out various functions are stored in the program memory 124, which may be implemented in ways generally similar to those described above regarding the program memory 42 shown in FIG. 2.

The program memory 124 includes a block of codes 190 for directing the server processor 122 to effect server shared plan management functions.

The variable memory 126 includes a plurality of storage locations including locations for storing group identifiers and group information including, for example, a location 160 for storing a first group identifier and a location 162 for storing first group information in association with the first group identifier. The variable memory 126 also includes a location 164 for storing a look up table for associating a representation of a group identifier with a group identifier. In various embodiments, the variable memory 126 may include a plurality of additional storage locations including locations for storing additional group identifiers and group information associated with other groups. In various embodiments, the plurality of storage locations may be stored in a database in the variable memory 126.

The variable memory 126 shown in FIG. 4 may be implemented in ways generally similar to those described above regarding the variable memory 44 shown in FIG. 2.

OVERVIEW

Referring to FIG. 1, in various embodiments, as discussed above, the group 22 of mobile devices including the first, second, and third mobile devices 12, 14, and 16 may be associated with a shared data plan provided by a data connection provider, the shared data plan defining limits and costs associated with data use by the group of mobile devices over the network 20.

For example, the shared data plan may define a flat fee and/or an initial cost per unit of usage (such as, for example a cost per byte) for all data transmitted and/or received by the group 22 of mobile devices below a total threshold (such as, for example, a bandwidth threshold), and may charge a premium fee and/or an overage cost per unit of usage for data transmitted and/or received by the first, second, and third mobile devices above the total threshold. Accordingly, in various embodiments, users of mobile devices included in the group 22 of mobile devices associated with the shared plan may wish to see information and/or alerts or notifications associated with monitoring data use on the mobile devices, for various reasons, such as, to help to plan data use and to avoid incurring unnecessary and surprise charges, for example. In various embodiments, to accomplish this, users of the first, second, and third mobile devices 12, 14, and 16 may cause their respective mobile devices to execute the process depicted by flowchart 200 shown in FIG. 5, for example.

Figure 5:
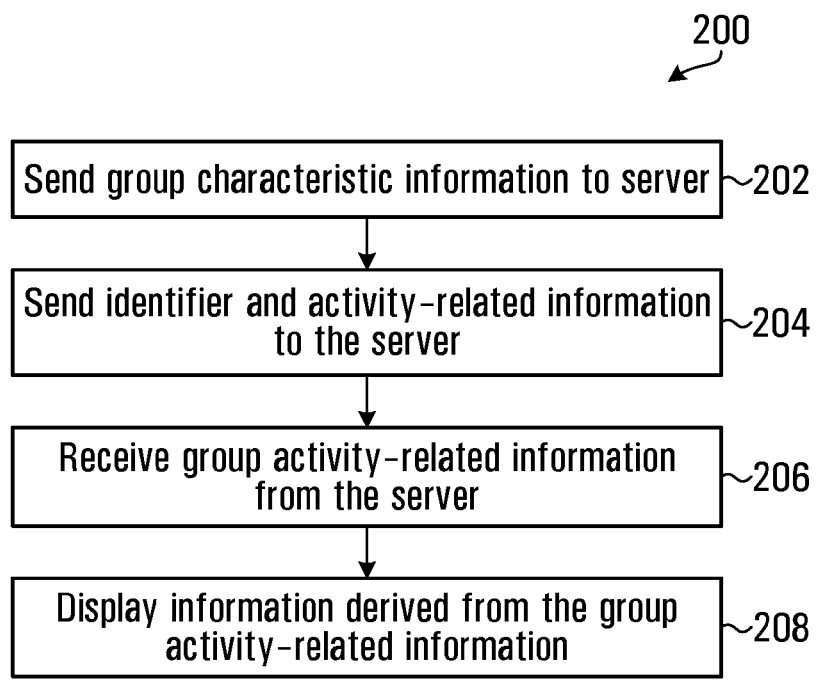
FIG. 5 is a flowchart depicting blocks of code for directing a mobile device processor in the system of FIG. 1 to facilitate collection and display of information related to data usage by a group of mobile devices in accordance with various embodiments of the invention.

Referring to FIG. 5, a flowchart depicting blocks of code for directing a mobile device processor to facilitate collection and display of information related to data usage by a group of mobile devices, is shown generally at 200.

For example, in various embodiments, the blocks may generally represent codes that may be read by the first mobile device processor 40 from the block of codes 50 of the program memory 42 of the first mobile device 12 shown in FIG. 2 for directing the first mobile device processor 40 to perform various functions related to facilitating collection and display of information related to data usage by the group 22 of mobile devices shown in FIG. 1. In various embodiments, the blocks may also or alternatively represent codes that may be read by the second mobile device processor 80 from the block of codes 92 of the program memory 82 of the second mobile device 14 shown in FIG. 3. In various embodiments, the blocks may also or alternatively represent codes that may be read by a third mobile device processor (not shown) of the third mobile device 16 shown in FIG. 1.

The actual code to implement each block may be written in a suitable programming language for application programming on the networked device, such as, by way of example only, Objective-C, Java™, $C^\#$, C, C++, Swift, Python, and/or assembly code.

Figure 6:
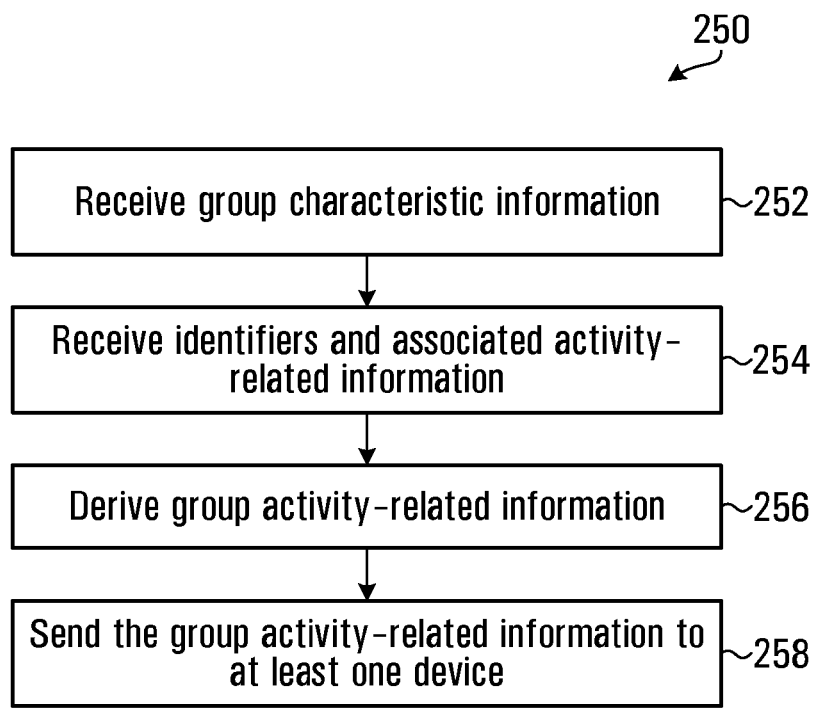
FIG. 6 is a flowchart depicting blocks of code for directing a server processor of the server shown in FIG. 4 to facilitate collection and display of information related to data usage by a group of mobile devices in accordance with various embodiments of the invention.

A flowchart 250 which may execute concurrently with the flowchart 200 is shown in FIG. 6, depicting blocks of code for directing the server processor 122 shown in FIG. 4 to facilitate collection and display of information related to data usage by a group of mobile devices.

In this specification, it may be stated that certain encoded entities such as applications perform certain functions. For example, the shared plan management application may be described as querying the operating system or storing data in variable memory. Whenever an application is described as taking an action, it will be understood that a processor is directed by code defining the application to take the action described.

Referring to FIG. 5, the flowchart 200 begins with block 202 which in various embodiments, directs a mobile device processor of a mobile device (e.g., the first mobile device processor 40 shown in FIG. 3, the second mobile device processor 80 shown in FIG. 3, or a third mobile device processor of the third mobile device 16 shown in FIG. 1) to send group characteristic information to the server 18 shown in FIG. 1.

In various embodiments, block 202 may direct the first mobile device processor 40 to send group creation information acting as group characteristic information to the server 18 to cause the server to create a group and to join the first mobile device 12 to the group. In other embodiments, blocks similar to block 202 may direct the second mobile device processor 80 or the third mobile device processor to send linking information acting as group characteristic information to the server 18 to cause the server to join the second or third mobile device to a pre-existing group.

Referring now to FIG. 6, the flowchart 250 begins with block 252 which directs the server processor 122 shown in FIG. 4 to receive group characteristic information and create a group. In various embodiments, block 252 may direct the server processor 122 to receive group creation information from the first mobile device 12 and linking information from the second and third mobile devices 14 and 16 and to store in memory group information derived from the group creation information and the linking information.

Referring back to FIG. 5, the flowchart 200 continues at block 204 which directs the mobile device processor (e.g., the first mobile device processor 40 shown in FIG. 2, the second mobile device processor 80 shown in FIG. 3, or a third mobile device processor of the third mobile device 16 shown in FIG. 1) to send an identifier and activity-related information to the server 18. In various embodiments, the identifier may be associated with a group or group information stored at the server and the activity-related information may include, for example, quantity information representing a quantity of data transmitted or received by the mobile device.

Each of the first, second, and third mobile devices 12, 14, and 16 may be directed by a block similar to the block 204 shown in FIG. 5 to send identifier and activity-related information to the server 18.

Referring to FIG. 6, the flowchart 250 continues at block 254 which directs the server processor 122 shown in FIG. 4 to receive the identifier and activity-related information. In various embodiments, block 254 may direct the server processor 122 to receive identifiers and activity-related information from a plurality of mobile devices. For example, block 254 may direct the server processor 122 to receive respective identifiers and activity-related information from each of the first, second, and third mobile devices 12, 14, and 16 shown in FIG. 1.

Referring still to FIG. 6, next, block 256 directs the server processor 122 shown in FIG. 4 to derive group activity-related information from the received activity-related information. In various embodiments block 256 may direct the server processor 122 to store the received activity-related information in memory as derived group activity-related information. In various embodiments, block 256 may direct the server processor 122 to additionally or alternatively modify or generate further information based on the received activity-related information.

Referring still to FIG. 6, next, block 258 directs the server processor 122 shown in FIG. 4 to send the group activity-related information to at least one mobile device. For example, in various embodiments, block 258 directs the server processor 122 to send the group activity-related information to at least one of the first, second, and third mobile devices 12, 14, and 16.

Referring back to FIG. 5, the flowchart 200 continues after block 204, to block 206 which directs the mobile device processor (i.e. the first mobile device processor 40 shown in FIG. 2, the second mobile device processor 80 shown in FIG. 3, or the third mobile device processor of the third mobile device 16) to receive group activity-related information from the server 18 shown in FIG. 1.

Next block 208 directs the mobile device processor to cause a display of the mobile device to display information derived from the group activity-related information to a user.

Accordingly, in various embodiments, by using the processes depicted by the flowcharts 200 and 250 shown in FIGS. 5 and 6, users of a plurality of mobile devices can cause group information defining a group to be stored at a server, each individually report their activity, receive group activity information from the server, and view information derived from the group activity information, such as, by way of example only, displays of group and/or other user's data usage, and/or alerts, notifications, or warnings associated with group and/or other user's data usage.

While, in the embodiments shown in FIGS. 5 and 6, blocks 202 and 252 of the flowcharts 200 and 250 are executed in conjunction with blocks 204, 206, and 208 and blocks 254, 256, and 258 respectively, in various embodiments, blocks 202 and 252 may be executed independently of blocks 204, 206, and 208 and blocks 254, 256, and 258 respectively to create groups more generally, for any of a variety of practical applications.

Further, whereas in the embodiments shown in FIGS. 5 and 6, blocks 204, 206, and 208 and blocks 254, 256, and 258 of the flowcharts 200 and 250 are executed in conjunction with blocks 202 and 252 respectively, in some embodiments, groups may be created and stored at the server using a method that does not require blocks 202 and 252, such as by an administrator inputting definitions of the groups at the server 18, for example. Accordingly, in various embodiments, 204, 206, and 208 and blocks 254, 256, and 258 may be executed independently of blocks 202 and 252.

Group Creation

Figure 7:
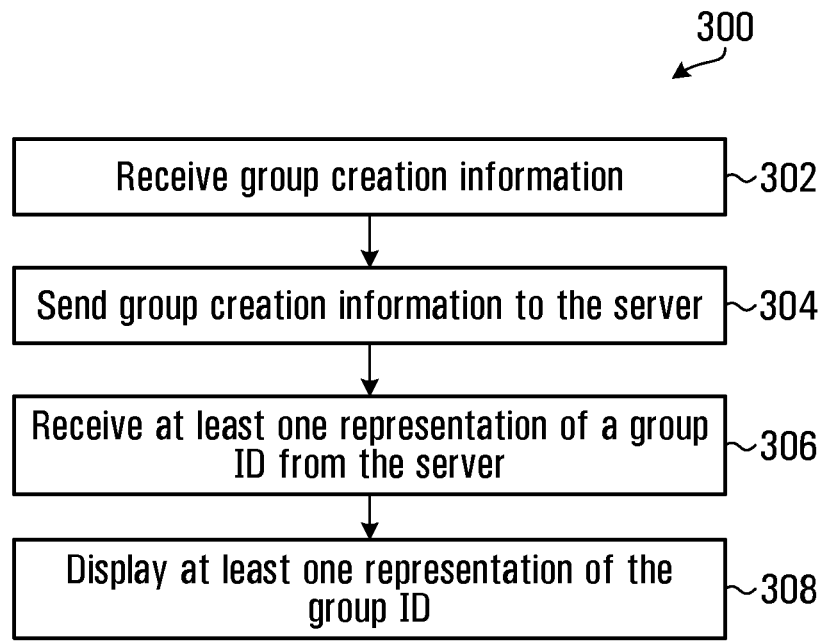
FIG. 7 is a flowchart depicting blocks of code for directing a first mobile device processor of the first mobile device shown in FIG. 2 to facilitate group creation in accordance with various embodiments of the invention.

As discussed above, blocks 202 and 252 of the flowcharts 200 and 250 shown in FIGS. 5 and 6 may facilitate group creation. Referring now to FIG. 7, a flowchart depicting, in more particularity, blocks of code for directing the first mobile device processor 40 shown in FIG. 2 to facilitate group creation is shown at 300. In various embodiments, the flowchart 300 may be included in the block of codes 52 shown in FIG. 2 and may be used to implement at least a portion of the block 202 shown in FIG. 5.

Figure 8:
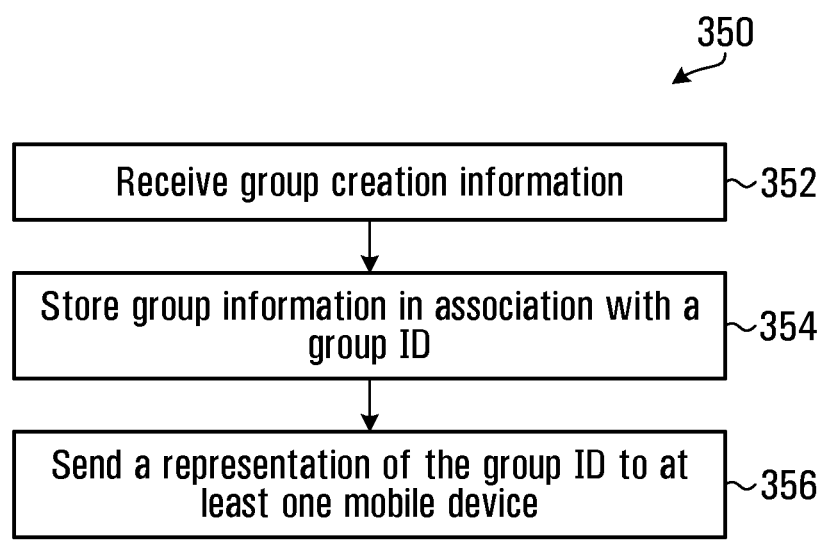
FIG. 8 is a flowchart depicting blocks of code for directing the server processor of the server shown in FIG. 4 to facilitate group creation in accordance with various embodiments of the invention.

A corresponding flowchart depicting blocks of code for directing the server processor 122 shown in FIG. 4 to facilitate group creation is shown at 350 in FIG. 8. In various embodiments, the flowchart 350 may be included in the block of codes 190 shown in FIG. 4 and used to implement at least a portion of the block 252 shown in FIG. 6.

While in the embodiments discussed below, for ease of reference, the first mobile device processor 40 of the first mobile device 12 shown in FIG. 2 is described as executing the flowchart 300, in various other embodiments, another mobile device, such as the second mobile device 14 or the third mobile device 16 shown in FIG. 1 may execute a flowchart generally similar to the flowchart 300.

Referring to FIG. 7, the flowchart 300 begins at block 302 which directs the first mobile device processor 40 shown in FIG. 2 to receive group creation information. In various embodiments, the group creation information may act as group characteristic information for defining characteristics associated with a group. In various embodiments, block 302 may direct the first mobile device processor 40 to store the group creation information in the location 60 of the variable memory 44 shown in FIG. 2.

In various embodiments, the group creation information may include a group member creation record for storing identifiers associated with a first member of the group 22 shown in FIG. 1, at least one plan or alert configuration creation record for storing plan or alert configuration information associated with the group 22, and an admin password creation field for storing a password to be used for managing the group associated with the group creation information.

FIG. 9 shows an exemplary representation of a group member creation record 400 that may be included in the group creation information. In the embodiment shown in FIG. 9, the group member creation record 400 includes a user display name field 402, a first device display name field 404, a first device identifier field 406, and a first subscriber identity module ("SIM") identifier field 408.

As discussed in further detail below, the user display name field 402 and the first device display name field 404 may be generated based on input received from a user and the first device identifier field 406 and the first SIM identifier field 408 may be generated based on properties received from the first mobile device 12 via the O/S, for example. In various embodiments, a single group member may be identifiable by any or all of the fields included in the group member creation record. In various embodiments, there may be a plurality of devices having associated device identifiers and SIM identifiers that may be associated with a single user display name and/or user identifier.

In some embodiments, the group member creation record 400 may also include other identifier fields, such as a device type field, a make type field, a model number field, a platform type field, a hardware identifier field, a screen size field, or a MAC address field, for example.

FIG. 10 shows an exemplary representation of a plan configuration creation record 409, in accordance with one embodiment. In various embodiments, the plan configuration creation record 409 may define various characteristics associated with a shared data plan through which the first mobile device 12 connects to the network 20 shown in FIG. 1.

In the embodiment shown in FIG. 10, the plan configuration creation record 409 includes a communication type field 410 for storing a representation of a type of communication or interface to be associated with the plan configuration creation record 409 (e.g. "mobile", "roaming", or "Wi-Fi"™) and a usage threshold field 412 for storing a usage threshold in bytes associated with data communication using the type of communication identified by the communication type field 410.

The plan configuration creation record 409 also includes a usage adjustment field 414 and a usage adjustment date field 416 for storing a correction value in bytes for correcting the group's total usage for a billing cycle and a time in Coordinated Universal Time ("UTC") when the correction value stored in the usage adjustment field 414 should be applied. For example, if a group started monitoring their data usage on Sep. 20, 2014 and a user knew that they had already used 5 GB of data in their billing cycle for the month of September, the user may cause the usage adjustment field 414 and the usage adjustment date field 416 to store values of $5 \times 10^9$ and 201409200000.

The plan configuration creation record 409 also includes an interval count field 418 and an interval type field 420 for storing a representation of an interval associated with the usage threshold. For example, in various embodiments, the interval count field 418 may store a count of 1 and the interval type field 420 may store an interval type of "month" such that together the interval count field 418 and the interval type field 420 store a representation of an interval of 1 month, which indicates that the usage threshold is to be applied to data use over a 1-month time period. In various embodiments, other interval types that may be stored in the interval type field 420 may include "day", "week", "hour", or "year", for example.

The plan configuration creation record 409 also includes a recurrence field 422 for storing a Boolean flag indicating whether the interval stored in the interval count field 418 and the interval type field 420 is recurring.

The plan configuration creation record 409 also includes a start date field 424 for storing a UTC time at which to start a first interval of length defined by the interval count field 418 and the interval type field 420.

In various embodiments, the plan configuration creation record 409 may also include an initial cost field 426 for storing a cost in dollars per byte associated with data usage up to the value of the usage threshold field 412 within an interval and an overage cost field 428 for storing a cost in dollars per byte associated with data usage over the value of the usage threshold field 412 within an interval.

In various embodiments, where overage costs are not based on per byte usage, but instead based on another unit, such as, for example, per megabyte usage or per gigabyte usage, the plan configuration creation record 409 may include an overage cost unit field for storing a number of bytes to which the value stored in the overage cost field should apply. For example, if overage usage is based on per megabyte usage, the plan configuration creation record 409 may include an overage cost unit field storing a value of "$10^6$".

In the embodiment shown in FIG. 10, the plan configuration creation record 409 also includes a coverage area field 430 for storing at least one location identifier or network identifier associated with a coverage area within which a plan associated with the plan configuration creation record 409 is applicable. For example, in the embodiment shown in FIG. 10, the coverage area field 430 includes the value, "302-720", which is the 3GPP PLMN code for Rogers Canada, which indicates that the plan configuration record is applicable when data use takes place on the Rogers Canada network. In some embodiments, the coverage area field 430 may include a value that corresponds to an ISO country code, such as, for example, "ca" for representing Canada.

Figures 11, 12:
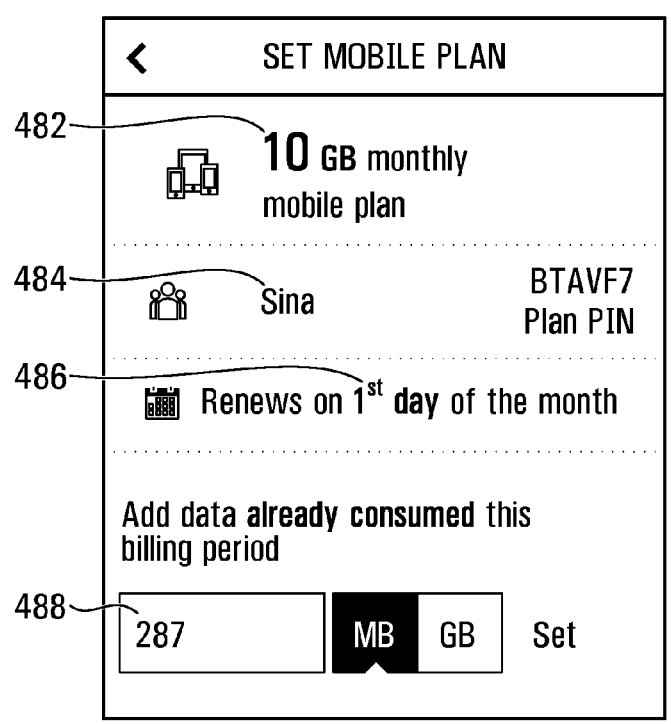
FIG. 11 is a representation of an exemplary alert configuration creation record that may be used in the system shown in FIG. 1.
FIG. 12 is a representation of an exemplary graphical user interface ("GUI") for allowing a user of the first mobile device shown in FIG. 2 to input group creation information in accordance with various embodiments of the invention.

FIG. 11 shows an exemplary representation of an alert configuration creation record 450, in accordance with one embodiment. In various embodiments, the alert configuration creation record 450 may define various characteristics associated with an alert that may be provided to at least one device included in the group 22 of mobile devices.

In the embodiment shown in FIG. 11, the alert configuration creation record 450 includes an alert name field 452 for storing a name for identifying the alert, a communication type field 454 for storing a representation of a type of communication or interface to be associated with the alert (e.g. "mobile", "roaming", or "Wi-Fi"™) and a rule type field 456 for storing a rule type associated with the alert. In various embodiments, the rule type field 456 may store one of the following strings, "absolute_threshold", "percentage_threshold", "cost_threshold", and "time".

The alert configuration creation record 450 also includes a threshold field 458 for storing a threshold value to be used in determining whether a category test has been met and an alert should be sent. In various embodiments, what the value of the threshold field 458 represents may depend on the rule type stored in the rule type field 456. For example, in various embodiments, where the value of the rule type field 456 is "absolute threshold", the value of the threshold field 458 may represent a number of bytes and the alert may be triggered when an aggregation of data counts indicating data used by a group is greater than the value of the threshold field 458. This embodiment and others are described in greater detail below having regard to applying category tests.

In various embodiments, the alert configuration creation record 450 may also include a delivery method field 460 for storing a value indicative of a method to be used to deliver alert information. In various embodiments, the value in the delivery method field 460 may be one of: "email", "sms" or "push_notification". In various embodiments other delivery methods may also or alternatively be used, such as, for example delivery via Facebook™ message, WhatsApp™, or Twitter™.

The alert configuration creation record 450 also includes an interval count field 462 and an interval type field 464 for storing a representation of an interval associated with the alert. The alert configuration creation record 450 also includes a recurrence field 466 and a start field 468.

In various embodiments, the group creation information may include a plurality of plan configuration creation records for defining a plurality of plans associated with the group. For example, a group may have one plan for Canada which is associated with a plan configuration record including a coverage area field set to "Canada" and another plan for all other locations which is associated with a plan configuration record including a coverage area field set to "outside_of_Canada".

In various embodiments the group creation information may include a plurality of alert configuration creation records for defining a plurality of alerts associated with the group.

In various embodiments, elements of the group creation information may be defined by user input and block 302 may direct the first mobile device processor 40 shown in FIG. 2 to receive elements of the group creation information via the touch sensitive display 48 from a user. In some embodiments, block 302 may direct the first mobile device processor 40 to produce signals for causing the display 48 to display at least one graphical user interface ("GUI") to allow the user of the first mobile device 12 to input elements of the group creation information.

In various embodiments, the at least one GUI may include data input interfaces for facilitating input of data to be stored in the user display name field 402 and the first device display name field 404 of the group member creation record 400 shown in FIG. 9. The at least one GUI may also include data input interfaces for facilitating a user inputting data to be stored in the communication type field 410, the usage threshold field 412, the usage adjustment field 414, the usage adjustment date field 416, the interval count field 418, the interval type field 420, the recurrence field 422, and the start date field 424 of the plan configuration creation record 409 shown in FIG. 10.

In various embodiments the at least one GUI may also include data input interfaces for facilitating a user inputting data to be stored in the alert name field 452, the communication type field 454, the rule type field 456, the threshold field 458, the delivery method field 460, the interval count field 462, the interval type field 464, the recurrence field 466, and the start field 468 of the alert configuration creation record 450 shown in FIG. 11. The at least one GUI may also include a data input interface for facilitating a user inputting data to be stored in the admin password field of the group creation information.

Referring to FIG. 12, an exemplary GUI for allowing a user of the first mobile device 12 to input elements of the group creation information in accordance with one embodiment is shown generally at 480. The GUI 480 includes a data input interface 482 for facilitating input of values to be stored in the usage threshold field 412, the communication type field 410, the interval count field 418, and the interval type field 420 of the plan configuration creation record 409 shown in FIG. 10. The GUI 480 also includes a data input interface 484 for facilitating input of a user name to be stored in the user display name field 402 of the plan configuration creation record 409 and a data input interface 486 for facilitating input of a value for the start date field 424 of the plan configuration creation record 409. The GUI 480 also includes a data input interface 488 for facilitating input of a value for the usage adjustment field 414 of the plan configuration creation record 409.

Referring back to FIG. 7, block 302 may also direct the first mobile device processor 40 shown in FIG. 2 to generate or receive elements of the group creation information independent of user input. In various embodiments, block 302 may direct the first mobile device processor 40 to generate or receive a Globally Unique Identifier ("GUID") and store this identifier in the first device identifier field 406 of the group member creation record 400 shown in FIG. 9. In some embodiments, for example, the block 302 may direct the first mobile device processor 40 to generate a 32-character lower-case hex representation of a 128-bit GUID based on information received from a random number generator via the O/S and store this representation in the first device identifier field 406 of the group member creation record 400 shown in FIG. 9.

In various embodiments, block 302 may also direct the first mobile device processor 40 to retrieve or receive from a SIM card included in the first mobile device 12, a SIM identity associated with the SIM card and generate a 40-character lower-case hex representation of the SIM identity and store this representation in the first SIM identifier field 408 of the group member creation record 400 shown in FIG. 9.

Referring to FIG. 7, block 304 then directs the first mobile device processor 40 to send group creation information to the server 18. In various embodiments, block 304 directs the first mobile device processor 40 to retrieve the group creation information including the group member creation record 400, the plan configuration creation record 409, the alert configuration creation record 450, and the admin password stored in the location 60 of the variable memory 44 and send a representation of the group creation information to the server 18 via the I/O interface 46 and the network 20, for example. In some embodiments, block 304 may direct the first mobile device processor 40 to send a JSON representation of the group member creation record 400, the plan configuration creation record 409, the alert configuration creation record 450, and the admin password field to the server 18, for example.

In various embodiments, block 304 may direct the first mobile device processor 40 to store elements of the group creation information locally, rather than sending the elements to the server 18. For example, in various embodiments, a user may wish to store at least one alert configuration record locally. In various embodiments, storing the alert configuration locally may facilitate providing an alert configuration record defining an alert that is only triggered on the first mobile device 12, such that it may not be necessary to send the alert configuration record to the server 18.

Accordingly, in various embodiments, block 304 may direct the first mobile device processor 40 to not send at least one alert configuration record to the server. Instead, in such embodiments block 304 may direct the first mobile device processor 40 to store the alert configuration record in the group information stored at the location 64 of the variable memory 44, for example.

In some embodiments, after a group has been created a user may use the shared plan management application to send additional information relating to the group creation information, such as plan or alert configuration creation records, to the server to cause the server 18 to amend existing group information, such as plan or alert configuration records, that is associated with a group or to add information, such as plan or alert configuration records, to be associated with the group. In some embodiments, a user may cause a mobile device to send messages to the server 18 to cause the server 18 to delete or disassociate certain plan or alert configuration records from the group. In some embodiments, an admin password may be required to make such amendments, additions, and/or deletions.

Referring now to FIG. 8, the flowchart 350 begins with block 352 which directs the server processor 122 shown in FIG. 4 to receive group creation information. In various embodiments, block 352 directs the server processor 122 to receive a JSON representation of a group creation record, a plan configuration creation record, an alert configuration creation record and/or an admin password, such as the group member creation record 400 shown in FIG. 9, the plan configuration creation record 409 shown in FIG. 10, the alert configuration creation record 450 shown in FIG. 11 and the admin password, from the first mobile device shown in FIG. 1 via the network 20 and the I/O interface 128, for example.

Block 354 then directs the server processor 122 shown in FIG. 4 to store group information in association with a group identifier. In various embodiments, block 354 directs the server processor 122 to generate a group identifier and store the generated group identifier as a first group identifier in the location 160 of the variable memory 126 shown in FIG. 4. In various embodiments, for example, the group identifier may be a unique 128-bit group identifier generated by the server processor 122.

Referring still to FIG. 8, in various embodiments, block 354 directs the server processor 122 to derive or generate group information from the group member creation record 400, the plan configuration creation record 409, the alert configuration creation record 450, and the admin password received at block 352 and store the derived group information as first group information in the location 162 of the variable memory 126 shown in FIG. 4 in association with the first group identifier stored in the location 160.

Figures 13, 14:
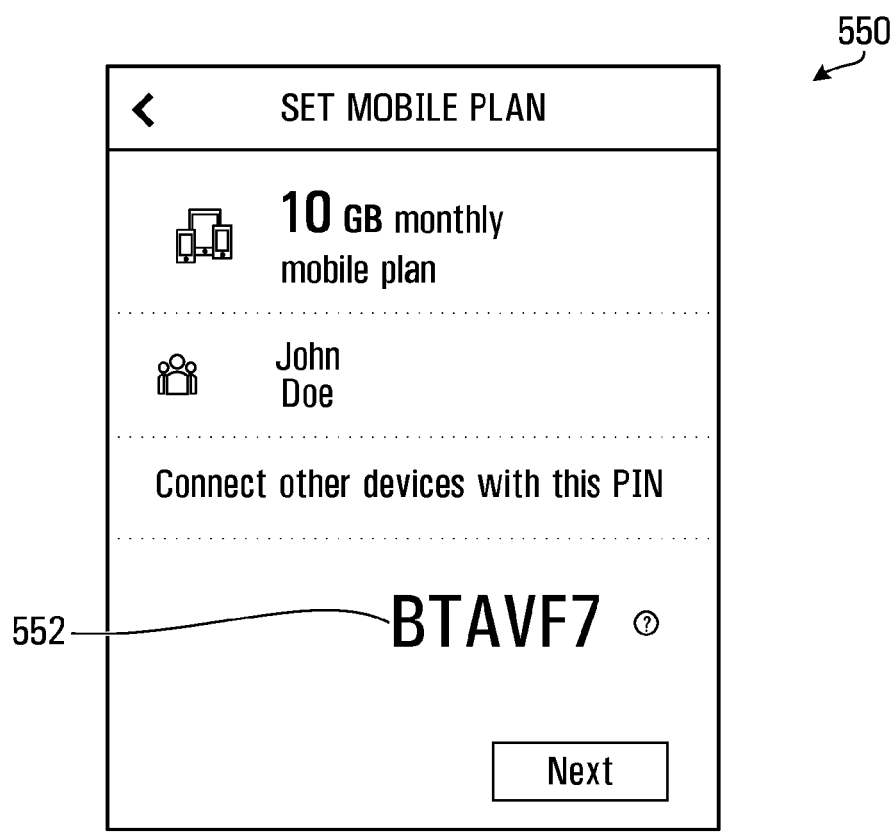
FIG. 13 is a representation of an exemplary group member record that may be used in the system shown in FIG. 1.
FIG. 14 is a representation of an exemplary display for displaying a group identifier in the system shown in FIG. 1 in accordance with various embodiments of the invention.

The group information may include a first group member record 500 as shown in FIG. 13. In the embodiment shown in FIG. 13, the first group member record 500 includes a user identifier field 502, a user display name field 504, a first device display name field 506, a first device identifier field 508, and a first SIM identifier field 510. Block 354 may direct the server processor to generate a representation of a GUID, such as for example a unique 32-character lower-case hex representation of a 128-bit GUID, and store this representation in the user identifier field 502. Block 354 may direct the server processor to copy corresponding values from the group member creation record 400 into the user display name field 504, first device display name field 506, first device identifier field 508, and first SIM identifier field 510.

In various embodiments, the generated group information also includes a plan configuration record that includes elements copied from the plan configuration creation record 409 shown in FIG. 10 and an alert configuration record that includes elements copied from the alert configuration creation record 450 shown in FIG. 11. The generated group information may also include an admin password field storing a value taken from the admin password of the group creation information.

Referring back to FIG. 8, block 356 then directs the server processor 122 to send at least one representation of the group identifier to at least one mobile device, such as the first mobile device 12 shown in FIG. 1. In various embodiments, block 356 may direct the server processor 122 to retrieve the first group identifier stored in the location 160 of the variable memory 126 and send a complete representation of the first group identifier to the first mobile device 12. In various embodiments the complete representation of the first group identifier may be a 32 character lower-case hex representation.

In some embodiments, block 356 may direct the server processor 122 to generate a user memorable representation of the group identifier or personal identification number ("PIN") and to store the user memorable representation and the group identifier in association with one another in a look up table in the location 164 of the variable memory 44, such that the group identifier can be determined from the PIN, using the look up table. In such embodiments, block 356 may direct the server processor 122 to send the user memorable representation of the group identifier to the first mobile device 12 via the I/O interface 128 and the network 20, for example.

In various embodiments, using a user memorable representation of the group identifier may facilitate a user remembering and easily communicating the representation of the group identifier to other users of mobile devices, such as the second and third mobile devices 14 and 16, for example, such that the users of the mobile devices may be able to easily remember and input the representation of the group identifier and link their devices to the group, as discussed in more detail below.

In various embodiments, the user memorable representation of the group identifier may be a random alphanumeric string generated by the server processor 122. In some embodiments, the user memorable representation may include 2 or more characters. In various embodiments, the user memorable representation may be short enough to facilitate memorization. In various embodiments, the user memorable representation may include a string of 7 or fewer characters. For example, in various embodiments the user memorable representation may be 6 characters. In various embodiments, the representation may have more or fewer than 6 characters. In some embodiments, the user memorable representation of the group identifier may include a word, a group of words, or a phrase.

In various embodiments block 356 may direct the server processor 122 to send the at least one representation of the group identifier using any of a variety of messages, such as, for example, a JSON representation, a push notification, an SMS message, or an email.

In some embodiments, block 356 may direct the server processor 122 to perform a limited broadcast of the at least one representation of the group identifier to devices having a spatial and temporal correlation to the first mobile device 12. For example, in some embodiments block 356 may direct the server processor to send the at least one representation of the group identifier to devices connected to the same local network as the first mobile device 12 (i.e., a local network included in the network 21 shown in FIG. 2, for example).

Referring back to FIG. 7, block 306 directs the first mobile device processor 40 shown in FIG. 2 to receive at least one representation of a group identifier from the server 18. In various embodiments, block 306 directs the first mobile device processor 40 to store at least one of the received representations of the group identifier in the location 62 of the variable memory 44.

In various embodiments, block 306 directs the first mobile device processor 40 to store a complete representation of the group identifier in the location 62 of the variable memory 44 shown in FIG. 2. In various embodiments, by storing the complete representation of the group identifier in the location 62 of the variable memory 44, this representation, rather than the user memorable representation, for example, may be used for future communication with the server 18. This may facilitate time limiting the association between the user memorable representation of the group identifier and the group identifier.

Referring to FIG. 7, block 308 then directs the first mobile device processor 40 shown in FIG. 2 to produce signals for causing at least one of the received representations of the group identifier to be displayed. In various embodiments, the representation of the group identifier may be displayed for dissemination amongst the plurality of mobile devices. Where at block 306, the first mobile device processor 40 received both a complete representation and a user memorable representation of the group identifier, in various embodiments, block 308 may direct the first mobile device processor 40 to produce signals for causing the display 48 of the first mobile device 12 shown in FIG. 2 to display the user memorable representation of the group ID, since, as discussed above, the user memorable representation may be easier to remember and communicate.

An exemplary display for displaying a group identifier on the display 48 in accordance with one embodiment is shown at 550 in FIG. 14. In the embodiment shown in FIG. 14, the display 550 includes a depiction of a user memorable representation of the group identifier at 552.

Linking Mobile Devices

In various embodiments, once a group identifier has been generated and stored at the server 18 in association with group information, such as with the first group identifier stored at the location 160 in association with the first group information stored at the location 162 of the variable memory 126 shown in FIG. 4, other group members having different identifiers may be associated with the stored group ID, thus associating or linking the group members with the group identifier and the group information stored at the server. In various embodiments, this association or linking may be considered group joining.

Figure 15:
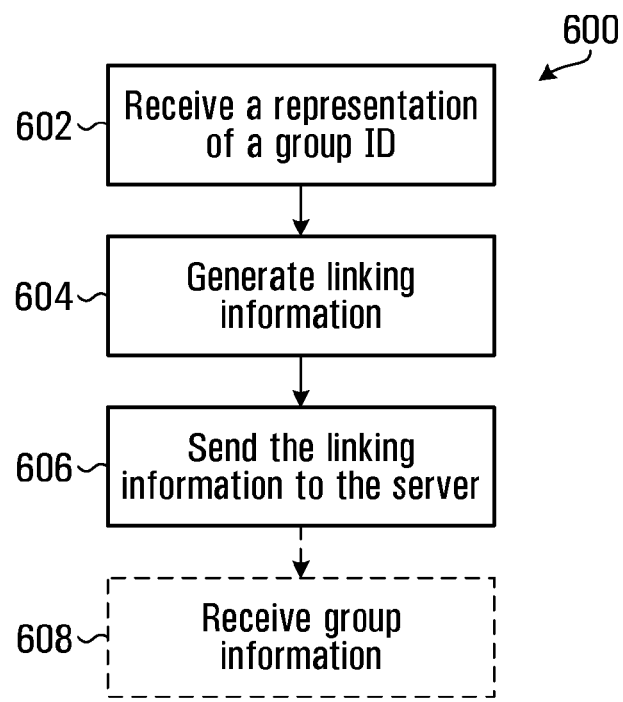
FIG. 15 is a flowchart depicting blocks of code for directing a second mobile device processor of the second mobile device shown in FIG. 3 to facilitate group joining in accordance with various embodiments of the invention.

Referring to FIG. 15, a flowchart depicting blocks of code for directing the second mobile device processor 80 shown in FIG. 3 to facilitate group joining is shown at 600. The flowchart 600 may be encoded in the blocks of code 92 for directing the second mobile device processor 80 to effect shared plan management application functions.

Figure 16:
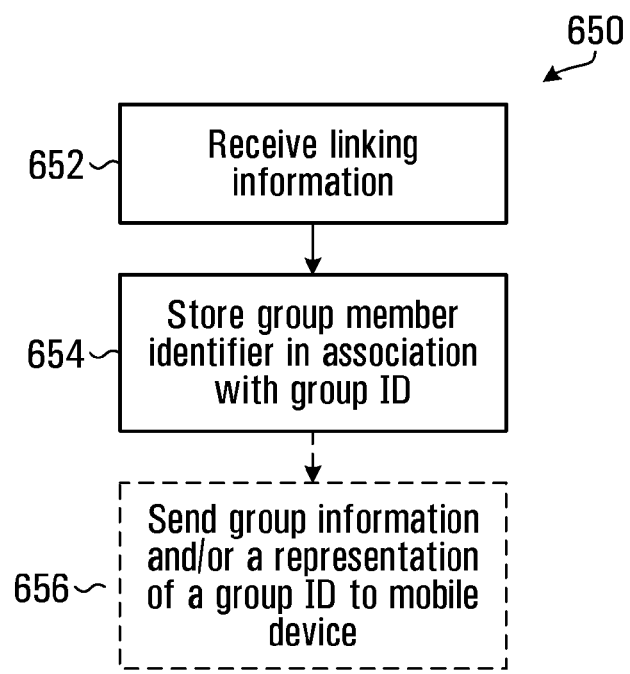
FIG. 16 is a flowchart depicting blocks of code for directing the server processor of the server shown in FIG. 4 to facilitate group joining in accordance with various embodiments of the invention.

A corresponding flowchart depicting blocks of code for directing the server processor 122 shown in FIG. 4 to facilitate group joining is shown at 650 in FIG. 16. The flowchart 650 may be encoded in the blocks of code 190 for directing the server processor 122 to effect shared plan management functions.

In various embodiments, the flowchart 600 shown in FIG. 15 may be used to implement at least a portion of the block 202 shown in FIG. 5 and the flowchart 650 shown in FIG. 16 may be used to implement at least a portion of the block 252 shown in FIG. 6.

While in the embodiments discussed below, for ease of reference, the second mobile device processor 80 of the second mobile device 14 shown in FIG. 3 is described as executing the flowchart 600, in various other embodiments, another mobile device, such as the first mobile device 12 or the third mobile device 16 shown in FIG. 1 may execute a flowchart generally similar to the flowchart 600.

Referring to FIG. 15, the flowchart 600 begins at block 602 which directs the second mobile device processor 80 shown in FIG. 3 to receive a representation of a group ID. In various embodiments, block 602 may direct the second mobile device processor 80 to store the representation of the group identifier in the location 94 of the variable memory 84 shown in FIG. 3, for example.

In various embodiments, block 602 may direct the second mobile device processor 80 shown in FIG. 3 to produce signals for causing the display 88 to display a GUI for causing a user of the second mobile device 14 to input the representation of the group identifier into a data input interface.

Figure 17:
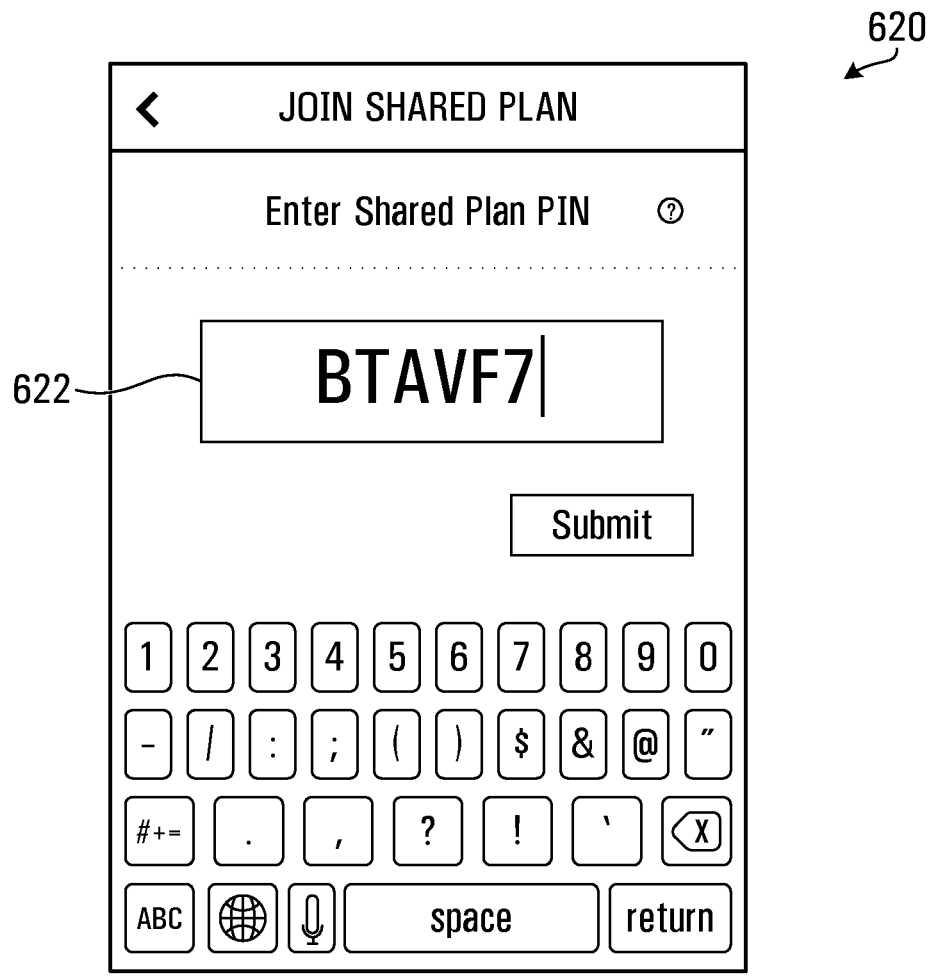
FIG. 17 is a representation of an exemplary GUI for causing a user to input a representation of a group identifier used in the system shown in FIG. 1 in accordance with various embodiments of the invention.

An exemplary display of a GUI for causing a user to input the representation of the group identifier in accordance with one embodiment that may be depicted on the display 88 is shown at 620 in FIG. 17. In the embodiment shown in FIG. 17, the display 620 includes a data input interface 622 for facilitating input of the representation of the group identifier.

Once a user inputs the representation of the group identifier into the data input interface 622, block 602 may direct the second mobile device processor 80 to store the representation in the location 94 of the variable memory 84 shown in FIG. 3.

In various embodiments, a user of the first mobile device 12 may have viewed the representation of the group identifier after block 308 shown in FIG. 7 had been executed, and the user of the first mobile device 12 may have disseminated the representation of the group identifier to the user of the second mobile device 14, such as by word of mouth or by email or text message, for example.

In some embodiments, block 602 of FIG. 15 may direct the second mobile device processor 80 to receive the representation of the group identifier via the network 20 via the I/O interface 86 or via the network 21 via the I/O interface 87 shown in FIG. 3 through a message such as an email or text message, for example, which in some embodiments may have been initiated by the server 18 shown in FIG. 1.

Block 604 of FIG. 15 then directs the second mobile device processor 80 shown in FIG. 3 to generate or receive linking information. The linking information may act as group characteristic information for defining characteristics of the group. In various embodiments, block 604 may direct the second mobile device processor 80 to store the linking information in the location 96 of the variable memory 84 shown in FIG. 3.

In various embodiments, block 604 of FIG. 15 may direct the second mobile device processor 80 shown in FIG. 3 to retrieve the representation of the group identifier stored in the location 94 of the variable memory 84 and include the representation of the group identifier in the linking information. Block 604 may also direct the second mobile device processor 80 to include in the linking information, a group member creation record generally similar to the group member creation record 400 shown in FIG. 9, but including information relating to a second user of the second mobile device 14. In various embodiments, values for the group member creation record included in the linking information may be generated or received generally similarly to as described above regarding the group member creation record 400.

Referring to FIG. 15, block 606 then directs the second mobile device processor 80 to send the linking information to the server 18. In various embodiments, block 606 may direct the second mobile device processor 80 to send a JSON representation of the linking information stored in the location 96 of the variable memory 84 to the server 18 via the I/O interface 86 and the network 20, for example.

Referring now to FIG. 16, the flowchart 650 begins with block 652 which directs the server processor 122 shown in FIG. 4 to receive linking information. In various embodiments, block 652 may direct the server processor 122 to receive a JSON representation of the linking information sent by the second mobile device 14, via the I/O interface 128 and the network 20 shown in FIG. 4, for example.

Block 654 of FIG. 16 then directs the server processor 122 shown in FIG. 4 to store a group member identifier taken from the linking information in association with a group identifier stored in the variable memory 84 that corresponds to the linking information. In various embodiments, block 654 directs the server processor to generate a group member record from a group member creation record included in the linking information and to store the group member record in association with a group identifier that corresponds to the representation of a group identifier included in the linking information.

For example, where the representation of the group identifier is a user memorable representation of the group identifier stored in the location 162 of the variable memory 126 shown in FIG. 4, block 654 of FIG. 16 may direct the server processor 122 shown in FIG. 4 to use the look up table stored in the location 164 of the variable memory 126 to retrieve a group identifier corresponding to the representation of the group identifier. Block 654 may then direct the server processor 122 to store the group member identifier in association with the retrieved group identifier. For example, in various embodiments, where the retrieved group identifier is the group identifier stored at the location 160 of the variable memory, block 654 may direct the second mobile device processor 80 to store the group member identifier in the group information stored in the location 162 of the variable memory 126.

In some embodiments, association of a user memorable representation with a group identifier in the look up table stored in the location 164 of the variable memory 126 may be time limited. For example, a block of codes included in the block of codes 52 may direct the server processor 122 to disassociate a user memorable representation from a group identifier in the look up table once a predetermined period of time has passed since the entry including the user memorable representation and group identifier was added to the look up table.

For example, in various embodiments a block of codes included in the block of codes 52 may direct the server processor 122 to disassociate a user memorable representation from a group identifier after 5 days have passed since the user memorable representation and group identifier entry was added to the look up table. In various embodiments, such time limiting of the look up table association between the user memorable representation and the group identifier may facilitate use of relatively short and thus user memorable representations of group identifiers for a large number of group identifiers without running out of unique user memorable representations.

Referring to FIG. 16, in some embodiments, the process depicted by the flowchart 650 may end after block 654, but in other embodiments, the process continues on at block 656. Block 656 directs the server processor 122 shown in FIG. 4 to send group information and/or a representation of a group identifier to the second mobile device 14 shown in FIG. 3. In various embodiments, block 656 may direct the server processor 122 to retrieve at least some elements of the first group information stored in the location 162 of the variable memory 84 and send a representation of the retrieved elements to the second mobile device 14 via the I/O interface 128 and the network 20, for example.

In various embodiments, block 656 of FIG. 16 may direct the server processor 122 shown in FIG. 4 to send only certain elements of the group information stored in the location 162 of the variable memory 84 to the second mobile device 14. For example, in various embodiments, block 656 may direct the server processor 122 to retrieve plan configuration records and/or alert configuration records from the group information and send the plan configuration records and/or the alert configuration records to the second mobile device 14.

In some embodiments, block 656 may direct the server processor 122 to send group activity-related information to the second mobile device 14.

In various embodiments, block 656 may direct the server processor 122 to send a representation of all of the group information stored in the location 162 of the variable memory 84 to the second mobile device 14 shown in FIG. 3.

In various embodiments, block 656 shown in FIG. 16 may direct the server processor 122 shown in FIG. 4 to send updated group information to all devices listed in the group information. Accordingly, block 656 may keep all of the devices in the group up to date whenever a new group member is added to the group.

In some embodiments, block 656 shown in FIG. 16 may direct the server processor 122 shown in FIG. 4 to send a complete (in various embodiments, the full 32 character lower-case hex) representation of the group identifier to the second mobile device 14 for storage in the variable memory 84 shown in FIG. 3, such that the second mobile device 14 can use the complete representation of the group identifier in place of a user memorable representation of the group identifier for future representations of the group identifier. In various embodiments, this may be desired when use of the user memorable representation of the group identifier is time limited.

Referring back to FIG. 15, in various embodiments, the process depicted by the flowchart 600 may end after block 606 but in other embodiments, the process continues at block 608 which directs the second mobile device processor 80 to receive group information from the server 18. In various embodiments, block 608 may direct the second mobile device processor 80 to store the group information in the variable memory 44, such as in the location 98 of the variable memory 84 shown in FIG. 3, for example.

Where block 656 shown in FIG. 16 directs the server processor 122 to send a complete representation of the group identifier to the second mobile device 14, block 608 of FIG. 15 may direct the second mobile device processor 80 to store the longer representation of the group identifier in the location 160 of the variable memory 126 shown in FIG. 3.

In various embodiments, other mobile devices may execute a flowchart generally similar to the flowchart 600 shown in FIG. 15 to facilitate group joining. For example, in one embodiment, the third mobile device 16 may execute a flowchart generally similar to the flowchart 600 shown in FIG. 15 to cause the server 18 to store elements of a group member record associated with the third mobile device 16 in the group information stored in the location 162.

Figure 18:
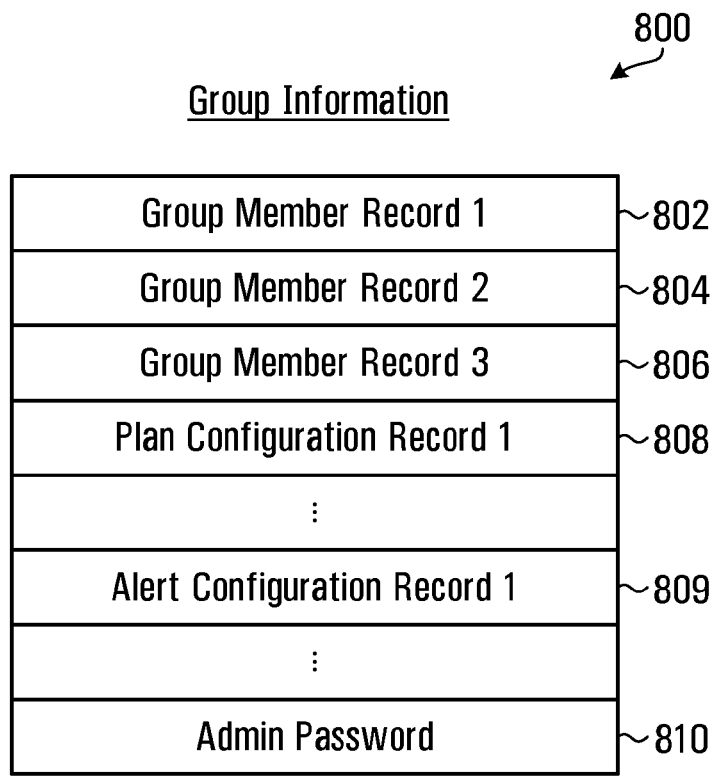
FIG. 18 is a representation of exemplary group information that may be stored using the system shown in FIG. 1.

Referring to FIG. 18, there is shown at 800 an exemplary representation of the group information, in accordance with one embodiment, that may be stored in the location 162 of the variable memory 126 of the server 18 shown in FIG. 4. In the embodiment shown, the first mobile device processor 40 has executed the flowchart 300 shown in FIG. 7, and the second mobile device processor 80 and the third mobile device processor have executed a flowchart similar to the flowchart 600 shown in FIG. 15.

In the embodiment shown, the group information 800 includes first, second and third group member records 802, 804, and 806, a first plan configuration record 808, a first alert configuration record 809 and an admin password field 810. In various embodiments, the group information 800 may include additional group member records, plan configuration records, and alert configuration records.

While the above describes how, in various embodiments, a group can be created and stored at a server by receiving, generating and storing various group information in association with a set of group member identifiers, it will be understood that in various embodiments, other systems and methods may be used to facilitate group creation. In such embodiments, blocks 202 and 252 shown in FIGS. 5 and 6 respectively may be varied or omitted.

Collection and Display of Information Related to Data Usage

Once group information has been stored at the server 18 shown in FIG. 4, as described above, for example, shared plan management applications installed on devices in a group, such as the group 22 shown in FIG. 1, may facilitate, in conjunction with the server shared plan management application, collection and display of information related to data usage by devices in the group.

In various embodiments, execution by each device of blocks 204, 206, and 208 of the flowchart 200 shown in FIG. 5 and execution by the server 18 of blocks 254, 256, and 258 of the flowchart 250 shown in FIG. 6 may facilitate the collection and display of the information related to data usage. While these blocks have been described in general terms above, they are described in greater detail with reference to various embodiments of the invention, below.

Figure 19:
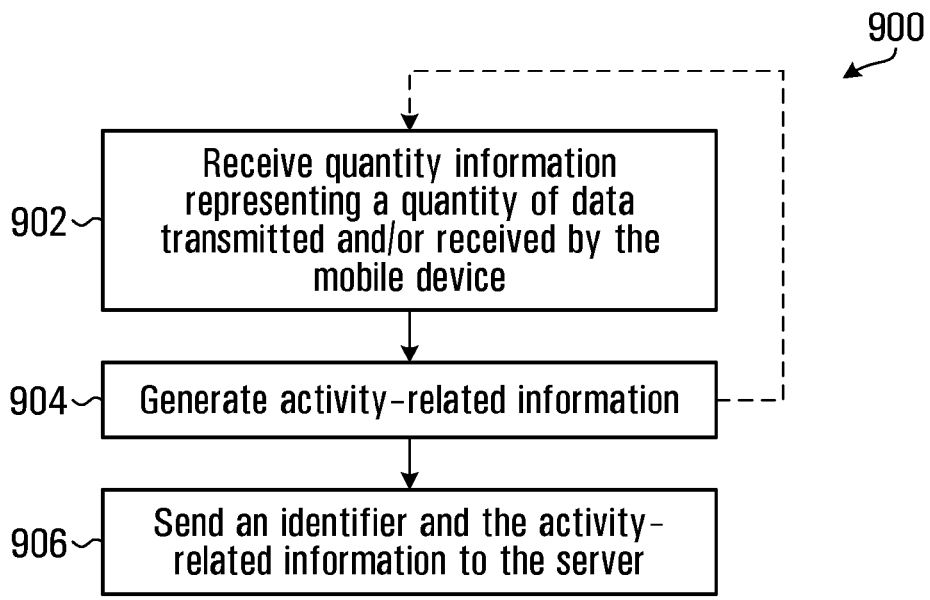
FIG. 19 is a flowchart depicting blocks of code for directing the first mobile device processor of the first mobile device shown in FIG. 2 to facilitate collection and display of information related to data usage in accordance with various embodiments of the invention.

Referring to FIG. 19, a flowchart depicting blocks of code for directing the first mobile device processor 40 shown in FIG. 2 to facilitate collection and display of information related to data usage is shown at 900. In various embodiments, the flowchart 900 may be included in the block of codes 52 shown in FIG. 2 and may be used to implement at least a portion of the block 204 shown in FIG. 5.

In various embodiments, other devices included in the group 22, such as the second and third mobile devices 14 and 16, may execute similar blocks of code to those depicted by the flowchart 900 to facilitate activity-related information monitoring in a similar way.

The flowchart 900 shown in FIG. 19 begins at block 902 which directs the first mobile device processor 40 shown in FIG. 2 to receive quantity information representing a quantity of data transmitted and/or received by the first mobile device. In various embodiments, block 902 may direct the first mobile device processor 40 to receive the quantity information from the operating system of the first mobile device. In such embodiments, shared plan management application may query the operating system of the first mobile device 12 to retrieve a count of data, in bytes, transmitted and/or received over a network over a time period.

For example, in various embodiments, block 902 may direct the shared plan management application to query the operating system of the first mobile device to retrieve a count of data, in bytes, transmitted and/or received via the I/O interface 46 over the network 20 over a time period. In some embodiments, block 902 may also or alternatively direct the shared plan management application to query the operating system of the first mobile device to retrieve a count of data, in bytes, transmitted and/or received via the I/O interface 47 over the network 21 over a time period.

Block 904 shown in FIG. 19 then directs the first mobile device processor 40 shown in FIG. 2 to generate activity-related information including the received quantity information. In various embodiments block 904 directs the first mobile device processor 40 to store the activity-related information in the location 66 of the variable memory 44. In various embodiments, block 904 directs the first mobile device processor 40 to generate an activity-related information record, such as the one shown at 1000 in FIG. 20 and store the activity-related information record in the location 66 of the variable memory 44.

Referring to FIG. 20, the activity-related information record 1000 includes a data count field 1002 for storing the count of data received during execution of block 902 and representing a count, in bytes, of data transmitted or received via the I/O interface 46 over the network 20 for a time period. In various embodiments, the activity-related information record 1000 may also include contextual information, such as a time period field 1004 for storing temporal information representing the time period during which the count of data stored in the data count field 1002 was transmitted or received, and/or a communication type field 1006 for storing communication type information representing a type of communication on which the count of data stored in the data count field 1002 was transmitted or received.

For example, in various embodiments, the time period field 1004 may store a representation of an hour long time period, such as a string having a format YYYYMMDDHH. For example, a string value of "2014102712" may represent a time period from Oct. 27, 2014 at 12:00 pm to Oct. 27, 2014 at 1:00 pm. In various embodiments, other time periods may be used, such as second long time periods, minute long time periods, day long time periods, or month long time periods, for example.

In various embodiments, the communication type field 1006 may store a value chosen from "Wi-fi"™, "Mobile" or "roaming", for example. In various embodiments, by storing communication type information, the activity-related information record 1000 may allow a user or group of users to track data usage over more than one communication type. For example, in various embodiments, a user or group of users may wish to monitor data usage over Wi-Fi™ communications separately from data usage over local and roaming cellular phone networks since constraints and costs for data use over these different communication types are in most cases different.

In various embodiments, the activity-related information record 1000 may include further contextual information. In the embodiment shown in FIG. 20, the activity-related information record 1000 includes a location field 1008 for storing location information, an application or app field 1010 for storing at least one application identifier acting as application usage information, a battery usage field 1012 for storing battery usage information, a device type field 1014 for storing a device type, a home operator field 1016 for storing a home operator identifier, a serving operator field 1018 for storing a serving operator identifier, and an O/S version field 1020 for storing an identifier of the version of O/S being used by the device.

In various embodiments, block 904 of FIG. 19 may direct the first mobile device processor 40 shown in FIG. 2 to query the operating system to cause the O/S to generate or retrieve location information representing a location or position associated with the time period represented by the value stored in the time period field 1004 shown in FIG. 20. Block 904 may direct the first mobile device processor 40 to receive the location information from the O/S or from memory and to store the location information in the location field 1008. For example, the location information may represent various types of representations of locations, such as, a GPS location which may comprise a latitude/longitude tuple, represented in signed, floating point form, a network identifier, an address, a city, a state, a province and/or a country.

In various embodiments, inclusion of location information in the activity-related information 1000 may facilitate a user or group of users being able to collect and display information regarding where data use takes place.

In various embodiments, block 904 of FIG. 19 may direct the first mobile device processor 40 shown in FIG. 2 to query the operating system to cause the O/S to generate or retrieve at least one application identifier identifying at least one application that was executed during the time period represented by the value stored in the time period field 1004. In various embodiments, the retrieved application identifier may be stored in the application field 1010. In various embodiments, the application identifier may represent a name of the application, such as, by way of example only, identifiers such as com.tripadvisor.tripadvisor, com.linkedin.android, or com.facebook.facebook.

In various embodiments, block 904 of FIG. 19 may direct the first mobile device processor 40 shown in FIG. 2 to query the operating system to cause the O/S to generate or retrieve a representation of battery usage during the time period represented by the value stored in the time period field 1004. For example, in various embodiments, the battery usage may represent an amount of energy in Joules used for the time period.

In various embodiments, block 904 of FIG. 19 may direct the first mobile device processor 40 shown in FIG. 2 to query the operating system to cause the O/S to generate or retrieve a device type and to include the retrieved device type in the device type field 1014. For example, in various embodiments, the device type may include an identifier identifying the make and model of the first mobile device 12.

In various embodiments, block 904 of FIG. 19 may direct the first mobile device processor 40 shown in FIG. 2 to query the operating system cause the O/S to generate or retrieve a home operator identifier and a serving operator identifier and to include the retrieved home operator identifier and serving operator identifier in the home operator field 1016 and the serving operator field 1018. In various embodiments, the home operator identifier may identify a home operator associated with the device and the serving operator identifier may identify a serving operator associated with the data use during the time period represented by the value stored in the time period field 1004.

In various embodiments, block 904 of FIG. 19 may direct the first mobile device processor 40 shown in FIG. 2 to query the operating system to cause the O/S to generate or retrieve an identifier of the version of O/S being used by the device and to include the retrieved O/S identifier in the device type field 1014.

In some embodiments, blocks 902 and 904 shown in FIG. 19 may be repeated a plurality of times and a plurality of activity-related information records may be stored in the location 66 of the variable memory 44 shown in FIG. 2 before the process moves on to block 906. For example, in various embodiments, blocks 902 and 904 may be repeated periodically, such as once every second, 30 seconds, minute, 5 minutes, or hour, and block 904 may direct the first mobile device processor 40 to move onto block 906 periodically, such as, once every 30 seconds, minute, 5 minutes, hour or 6 hours.

In various embodiments, block 904 may direct the first mobile device processor 40 to base the waiting period before moving onto block 906 on a state of the device, such as, for example whether a screen is on or whether an application is running in the foreground or background. In various embodiments, block 904 may direct the first mobile device processor 40 to apply a threshold test to the activity-related information and only move onto block 906 when the activity-related information meets the threshold. For example, block 904 may direct the first mobile device processor 40 to determine whether a sum of data counts included in the activity-related information is greater than a threshold amount, such as, for example 1 megabyte. Accordingly, in various embodiments, block 904 may facilitate avoiding sending reports for "trivial" activity-related quantities at a high frequency.

Referring to FIG. 19, Block 906 then directs the first mobile device processor 40 shown in FIG. 2 to send an identifier associated with the group 22 of mobile devices and the activity-related information to the server 18. In various embodiments, block 906 directs the first mobile device processor 40 to generate and send to the server 18 a representation of an identifier record, such as the one shown at 1100 in FIG. 21 and a representation of the one or more activity-related information records stored in the location 66 of the variable memory 44. For example, block 906 may direct the first mobile device processor 40 to send a JSON representation of the identifier record and the activity-related information records to the server 18 via the network 20 shown in FIG. 1.

Referring to FIG. 21, in various embodiments, the identifier record 1100 includes a group identifier field 1102, a device identifier field 1104 and a SIM identifier field 1106. In some embodiments, the identifier record 1100 may also or alternatively include a user identifier field.

Block 906 shown in FIG. 19 may direct the first mobile device processor 40 shown in FIG. 2 to retrieve a representation of the group identifier from the location 62 of the variable memory 44 and to include the representation in the group identifier field 1102. Accordingly the group identifier field 1102 may include a value that represents a group identifier stored at the server 18 in association with group information. Thus, the value in the group identifier field 1102 may be associated at the server 18 shown in FIG. 4 with group member records included in the group information, the group member records identifying group members associated with the group 22 of mobile devices.

Values for the device identifier field 1104 shown in FIG. 21 and the SIM identifier field 1106 may have been previously generated as described above for block 302 shown in FIG. 7 and block 906 shown in FIG. 19 may direct the first mobile device processor 40 to retrieve these values from memory, such as from the location 60 of the variable memory 44, for example.

In various embodiments, once block 906 of the flowchart 900 shown in FIG. 19 has been completed, this may mark the completion of the block 204 shown in FIG. 5.

In various embodiments, upon completion of the block 204 shown in FIG. 5, block 254 shown in FIG. 6 may be executed by the server processor 122 shown in FIG. 4. As discussed above, generally, block 254 directs the server processor 122 shown in FIG. 4 to receive identifiers and activity-related information sent by mobile devices executing a block similar to the block 204 shown in FIG. 5. Specifically, in various embodiments, block 254 may direct the server processor 122 to receive a JSON representation of an identifier record, such as the identifier record 1100 shown in FIG. 21, and an activity-related information record, such as the activity-related information record 1000 shown in FIG. 20 from a mobile device, such as the first mobile device 12 shown in FIG. 2, via the I/O interface 128 and the network 20.

Referring to FIG. 6, in various embodiments, block 256 may then direct the server processor 122 to derive group activity-related information from the received activity-related information. In various embodiments, block 256 may direct the server processor 122 to store the group activity-related information in the group information stored in the location 162 of the variable memory 126.

Figure 22:
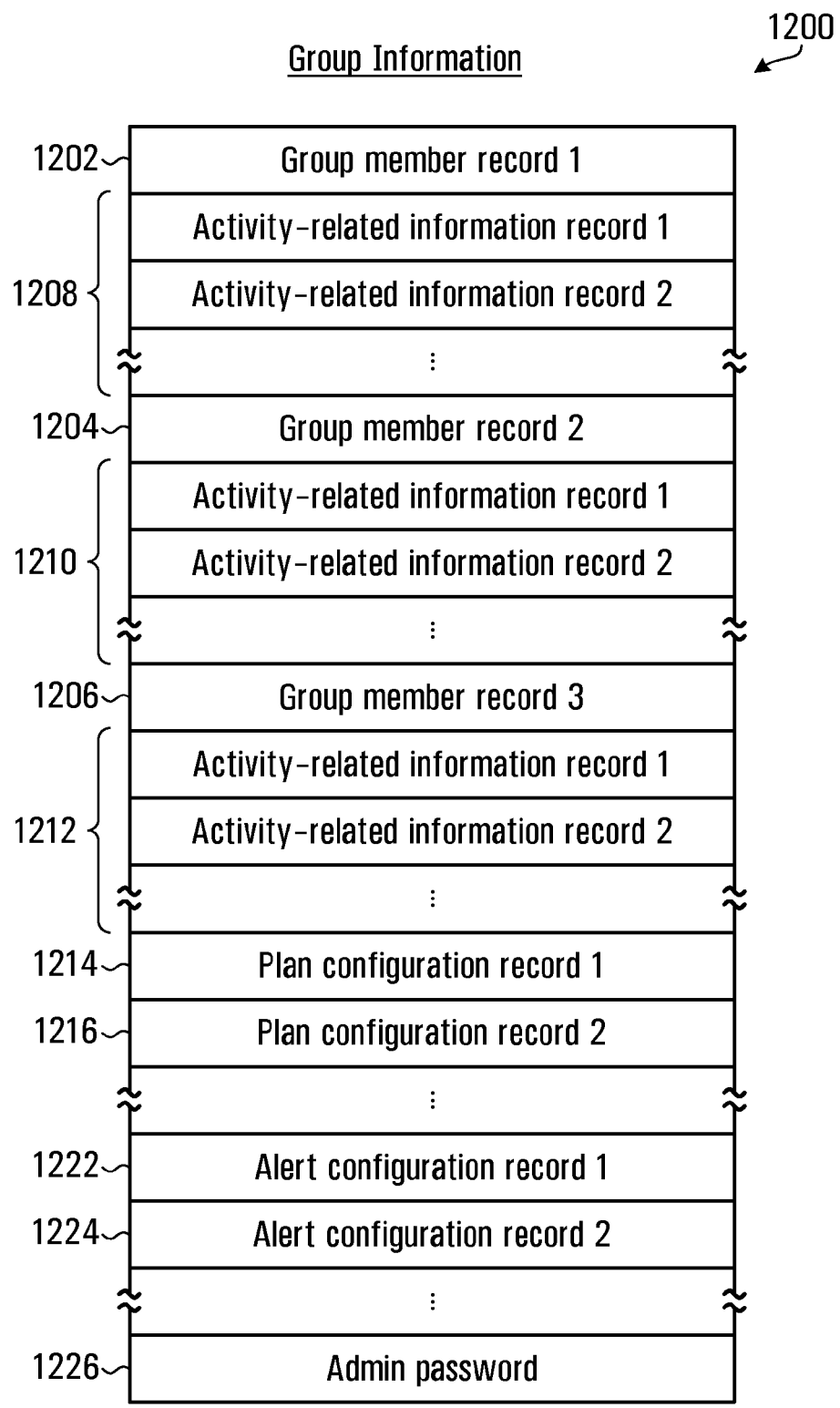
FIG. 22 is a representation of exemplary group information that may be used in the system shown in FIG. 1.

An exemplary representation of group information that may be stored in the location 162 of the variable memory 126 in accordance with one embodiment is shown generally at 1200 in FIG. 22. The group information 1200 shown in FIG. 22 includes first, second, and third group member records 1202, 1204, and 1206 generally similar to the group member records 802, 804, and 806 shown in FIG. 18. The group information 1200 also includes sets of activity-related information records 1208, 1210 and 1212 that have been stored in association with respective ones of the group member records 1202, 1204, and 1206. As discussed below, in various embodiments, the group member records 1202, 1204, and 1206 and the sets of activity-related information records 1208, 1210 and 1212 may act as derived group activity-related information.

In the embodiment shown in FIG. 22, the group information 1200 also includes first and second plan configuration records 1214 and 1216, first and second alert configuration records 1222 and 1224 and an admin password field 1226.

The group information 1200 shown in FIG. 22 is depicted as flattened for illustration purposes. In various embodiments, the group member records and plan/alert configuration records may be stored as logically distinct from the group's activity-related information records. In various embodiments, there may exist a one-to-many relationship between each group member record and the activity-related information records associated therewith. Accordingly, in various embodiments, it may be possible to query the group member records and plan/alert configuration records independently of the activity-related information records (i.e. on the one hand, the group membership and plan/alert configurations may be queried, and on the other hand, usage incurred by the members of said group may be queried).

Referring to FIG. 23, a block of code that in various embodiments may be included in the block of codes 190 shown in FIG. 4 and may be used to implement at least a portion of the block 256 shown in FIG. 6 is shown at 954.

Block 954 shown in FIG. 23 directs the server processor 122 shown in FIG. 4 to store the received activity-related information in association with a group associated with the identifier. In various embodiments, the stored activity-related information and/or the stored group member records included in the group information may act as derived group activity-related information. In various embodiments, block 954 directs the server processor to read the identifier fields included in an identifier record such as the identifier record 1100 shown in FIG. 21 and to store an associated activity-related information record, such as the activity-related information record 1000 shown in FIG. 20 in association with a group identifier that corresponds to the identifier fields.

For example, where at block 254, the identifier record 1100 shown in FIG. 21 and the activity-related information record 1000 shown in FIG. 20 is received, block 954 shown in FIG. 23 may direct the server processor 122 to look up a group identifier stored in the variable memory 126 shown in FIG. 4 that corresponds to the group identifier field 1102 of the identifier record 1100 and to copy and store the activity-related information record 1000 into group information stored in the variable memory 126 in association with the group identifier.

In some embodiments, where the group identifier field 1102 includes a representation of a group identifier, such as a user memorable representation of a group identifier, block 954 shown in FIG. 23 may direct the server processor 122 shown in FIG. 4 to use the look up table stored at location in the location 164 of the variable memory 126 to determine a group identifier that corresponds to the representation of the group identifier.

In various embodiments, referring to FIG. 23, block 954 may direct the server processor 122 shown in FIG. 4 to store the values of the received activity-related information record in association with a group member record that corresponds to the received identifier record. For example, block 954 may direct the server processor 122 to determine that the device identifier field 1104 and the SIM identifier field 1106 included in the received identifier record 1100 correspond to the first group member record 1202. Accordingly, block 954 may direct the server processor 122 to store the activity-related information record 1000 in the set of activity-related information records 1208 associated with the first group member record 1202.

Referring back to FIG. 6, in various embodiments blocks 254 and 256 may be repeated a plurality of times such that the server 18 receives a plurality of identifiers and activity-related information records and derives group activity-related information therefrom.

After block 256 is completed, in various embodiments, the process may continue at block 258 which may direct the server processor 122 shown in FIG. 4 to send group activity-related information to at least one device.

In some embodiments, block 258 shown in FIG. 6 may direct the server processor 122 shown in FIG. 4 to send a representation of the group information stored in the location 162 of the variable memory 126 to all of the devices identified in the group information. In various embodiments, where a device has already received at least a portion of the group information, in an early execution of block 258, for example, block 258 may direct the server processor 122 to send only a portion of the group information to the device to facilitate updating of a locally stored copy of the group information.

In various embodiments, block 258 shown in FIG. 6 may direct the server processor 122 shown in FIG. 4 to send the group activity-related information periodically. For example, in various embodiments, block 256 may direct the server processor 122 to send the group activity-related information once every minute, hour, day, or week.

In various embodiments, block 258 shown in FIG. 6 may also or alternatively be triggerable by a mobile device sending a message to the server 18 requesting that the server 18 send the group activity-related information. The request message may include an identifier associated with a group identifier. Block 258 may direct the server processor 122 to, in response to receiving the request message, send group activity-related information associated with the identified group identifier to the requesting device.

Referring back to FIG. 5, after group activity-related information has been sent to the mobile devices, block 206 of the flowchart 200 may be executed. In various embodiments, block 206 may direct the first mobile device processor 40 shown in FIG. 2 to receive the group activity-related information and to store the group activity-related information in the group information in the location 64 of the variable memory 44. Accordingly, in various embodiments, block 206 may direct the first mobile device processor 40 to store group information, such as the group information 1200 shown in FIG. 22 in the location 64 of the variable memory 44.

As discussed above in general terms, in various embodiments, block 208 may then direct the first mobile device processor 40 to display information derived from the group activity-related information. Referring to FIG. 24, a flowchart depicting blocks of code for directing the first mobile device processor 40 shown in FIG. 2 to facilitate displaying information derived from the group activity-related information is shown at 1300. In various embodiments, the flowchart 1300 may be included in the block of codes 52 shown in FIG. 2 and may be used to implement at least a portion of the block 208 shown in FIG. 5.

The flowchart 1300 shown in FIG. 24 begins with block 1302 which directs the first mobile device processor 40 to derive information from the group activity-related information.

In various embodiments, block 1302 shown in FIG. 24 may direct the first mobile device processor 40 shown in FIG. 2 to sum data counts included in the group-activity related information included in the group information to generate at least one group data count, which may act as derived information.

For example, in various embodiments, block 1302 shown in FIG. 24 may direct the first mobile device processor 40 shown in FIG. 2 to derive a plurality of data counts, each associated with a plan configuration record. In such embodiments, block 1302 may direct the first mobile device processor 40 to determine, for each activity-related information record included in the group information, whether the activity-related information record includes contextual information that corresponds to a plan configuration record. If the first mobile device processor 40 determines that the contextual information does correspond to a plan configuration record, block 1302 may direct the first mobile device processor 40 to aggregate or sum a data count included in the activity-related information in a group data count associated with the plan configuration record.

In various embodiments, block 1302 shown in FIG. 24 may direct the first mobile device processor 40 shown in FIG. 2 to determine whether a communication type included in the communication type field of an activity-related information record, such as the activity-related information record 1000 shown in FIG. 20, corresponds to a communication type included in a plan configuration record. If the communication type corresponds, block 1302 may direct the first mobile device processor 40 to include a data count included in the activity-related information record in a group data count associated with the plan configuration record.

Block 1302 may direct the first mobile device processor 40 to perform the above to include each data count included in each activity-related information record in a group data count associated with a plan configuration record. Accordingly, block 1302 may direct the first mobile device processor 40 to derive a respective group data count for each plan configuration record.

In various embodiments, block 1302 shown in FIG. 24 may also or alternatively direct the first mobile device processor 40 shown in FIG. 2 to compare other contextual information included in the activity-related information records to aggregate or sum other data counts. By way of example only, in various embodiments, block 1302 may direct the first mobile device processor 40 to aggregate or sum data counts associated with location information that meets a location test (e.g. location information that corresponds to location information included in a plan configuration record and thus indicates that the location is within a predetermined region), application usage information that meets an application type test (e.g. application usage information that corresponds to application usage information included a plan configuration record and thus indicates that a certain type of application was used), temporal information that meets a temporal test (e.g. temporal information that corresponds to temporal information included in a plan configuration record and thus indicates that data use occurred within a particular time period) and/or device type information that meets a device type test (e.g. device type information that corresponds to device type information included in a plan configuration record and thus identifies a particular device type).

In some embodiments, block 1302 shown in FIG. 24 may also or alternatively direct the first mobile device processor 40 to aggregate or sum data counts included in activity-related information records based on various properties of the group member records. For example, block 1302 shown in FIG. 24 may direct the first mobile device processor 40 to aggregate or sum all data counts included in activity-related information records associated each group member record in the group information, to generate member data counts representing total data consumed by each member.

In various embodiments, each generated data count that includes a sum or aggregation of data counts may act as information derived from the group-activity-related information.

Category Test and Alerts or Notifications

Referring back to FIG. 1, in various embodiments, there may be many reasons for a user of one of the first, second or third mobile devices 12, 14, and 16 to wish to be alerted based on properties of activity-related information stored in association with the group 22. For example, a user may wish to monitor individual and/or group data usage in order to better understand how their shared plan usage is occurring. In some embodiments, by better understanding their shared plan usage, users may be able to change their behavior to more efficiently act within their plan.

Referring to FIG. 25, a flowchart depicting blocks of code for directing the first mobile device processor 40 shown in FIG. 2 to facilitate deriving alert information from the group activity-related information is shown at 1400. In various embodiments, the flowchart 1400 may be included in the block of codes 52 shown in FIG. 2 and may be used to implement at least a portion of the block 1302 shown in FIG. 24.

The flowchart 1400 shown in FIG. 25 begins with block 1402 which directs the first mobile device processor 40 shown in FIG. 2 to determine whether the group activity-related information meets a category test. In various embodiments, alert configuration records included in the group information may each define a category test and block 1402 may direct the first mobile device processor to retrieve an alert configuration record from the group information stored in the location 64 of the variable memory 44 to determine how to apply a category test. In various embodiments, flowchart 1400 may be repeated for each alert configuration record stored in the group information.

Figures 26, 27:
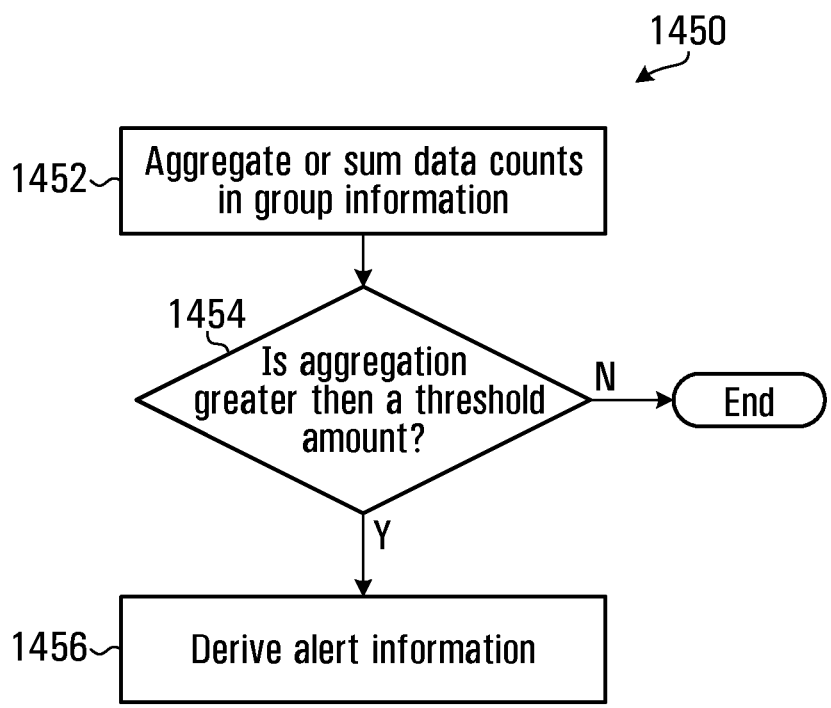
FIG. 26 is a representation of an exemplary alert configuration record that may be used in the system shown in FIG. 1.
FIG. 27 is a flowchart depicting blocks of code for directing the first mobile device processor of the first mobile device shown in FIG. 2 to facilitate category testing in accordance with various embodiments of the invention.

For example, in various embodiments, a first alert configuration record 1420 as shown in FIG. 26 may be stored in the group information stored in the location 64 of the variable memory 44 shown in FIG. 2. Block 1402 shown in FIG. 25 may direct the first mobile device processor 40 to read the alert configuration record 1420 and apply a category test based on contents of the first alert configuration record 1420. In various embodiments where the rule type stored in the rule type field is "absolute_threshold" as it is in the first alert configuration record 1420, block 1402 may direct the first mobile device processor 40 to execute flowchart 1450 shown in FIG. 27.

The flowchart 1450 depicts blocks of code for directing the first mobile device processor 40 shown in FIG. 2 to facilitate aggregation category testing. In various embodiments, the flowchart 1450 may be included in the block of codes 52 shown in FIG. 2 and may be used to implement at least a portion of the blocks 1402 and 1404 shown in FIG. 25.

The flowchart 1450 shown in FIG. 27 begins with block 1452 which directs the first mobile device processor 40 shown in FIG. 2 to aggregate or sum data counts from group activity-related information to generate an aggregation of the data counts. In various embodiments, block 1452 may direct the first mobile device processor 40 to aggregate or sum data counts generally as described above having regarded to block 1302 shown in FIG. 24 to generate at least one summed data count.

In various embodiments, block 1452 shown in FIG. 27 may direct the first mobile device processor 40 shown in FIG. 2 to read contents of the alert configuration record, in order to determine which data counts to sum at block 1452.

In the embodiment shown in FIG. 27, the alert configuration record includes a communication type of "Mobile" and fields defining an interval and so, in various embodiments, block 1452 may direct the first mobile device processor 40 shown in FIG. 4 to sum only data counts that are included in activity-related information records which include a communication type of "Mobile" and have time periods that fall within the interval.

In various embodiments, an alert configuration record may include various additional or alternative fields which may cause block 1452 shown in FIG. 27 to direct the first mobile device processor 40 shown in FIG. 2 to sum only particular data counts, as discussed above having regard to the plan configuration record. For example, in various embodiments, an alert configuration record may include a location field for causing block 1452 to direct the first mobile device processor 40 to sum data counts that are stored in activity-related information records that include a particular location or locations. For example, block 1452 may direct the first mobile device processor 40 to sum only data counts where a location field stores a value representing a location outside of Canada or a location within the United States, for example.

In some embodiments, an alert configuration record may include an application identifier field for causing block 1452 shown in FIG. 27 to direct the first mobile device processor 40 shown in FIG. 2 to sum data counts that are stored in activity-related information records that include a particular application identifier, such as com.tripadvisor.tripadvisor, com.linkedin.android, or com.facebook.facebook, for example.

In some embodiments, the alert configuration record may include at least one identifier field for causing block 1452 shown in FIG. 27 to direct the first mobile device processor 40 shown in FIG. 2 to sum data counts that are stored in association with particular group member records. For example, block 1452 may direct the first mobile device processor 40 to sum data counts that are stored in association with group member records that include a particular user ID, SIM ID, and/or device ID.

In some embodiments, an alert configuration record may be associated with a plan configuration record included in the group information and block 1452 may direct the first mobile device processor 40 to refer to the associated plan configuration record in order to determine what data counts to sum. For example, in various embodiments, an alert configuration record may be associated with a plan configuration record and so the alert configuration record may not need to include an interval count, interval type, recurrence, or start field, as block 1452 may direct the first mobile device processor 40 to use corresponding values for these fields taken from the associated plan configuration record.

Referring to FIG. 27, block 1454 directs the first mobile device processor 40 to determine whether the aggregation or summed data count generated at block 1452 is greater than a threshold amount. Block 1454 may direct the first mobile device processor 40 to determine the threshold amount based on the alert configuration record. In various embodiments, where the alert configuration record includes a rule type of "absolute_threshold", the value stored in the threshold field of the alert configuration record may represent an absolute threshold. Thus, block 1454 may direct the first mobile device processor 40 to determine the threshold amount as equal to the value stored in the threshold field.

In some embodiments, block 1454 shown in FIG. 27 may direct the first mobile device processor 40 shown in FIG. 2 to factor a proportion of the current interval that has elapsed when determining the threshold amount. For example, if 50% of an interval has elapsed, block 1454 may direct the first mobile device processor 40 to scale the threshold amount by 50%.

Together, blocks 1452 and 1454 of FIG. 27 may act to apply a category test to the group information. In particular, blocks 1454 and 1452 may facilitate application of an aggregation threshold category test to the group information, the aggregation threshold category test determining whether the group information includes particular data counts which when summed are greater than a threshold amount.

If at block 1454, the first mobile device processor 40 determines that the aggregation is not greater than the threshold amount and thus the aggregation threshold category test is not satisfied, the process ends. If at block 1454 the first mobile device processor 40 determines that the aggregation is greater than the threshold amount and thus the aggregation threshold category test is satisfied, the process continues at block 1456.

Block 1456 directs the first mobile device processor 40 to generate alert information, which may act as information derived from the group activity-related information. In various embodiments, the alert information may represent at least a portion of the alert configuration record. In some embodiments, the alert information may include a unique handle or name that identifies the alert configuration record. In various embodiments, block 1456 may direct the first mobile device processor 40 to store the alert information in the variable memory 44 shown in FIG. 2.

In some embodiments, the alert information may include a string message and in various embodiments the string message may be customized based on the group activity-related information or the alert configuration record. For example, for the alert configuration record 1420 shown in FIG. 26, the alert information may include the string, "Shared Plan Consumption Critical Over 8 GB used on Mobile" wherein the number "8" was based on the aggregated or summed data counts and the word "Mobile" was retrieved from the alert configuration record.

While the flowchart 1450 shown in FIG. 27 has been described above having regard to an alert information record that includes a rule type of "absolute threshold", in various embodiments, an alert configuration record that includes a rule type of "cost_threshold", such as second alert configuration record 1422 shown in FIG. 28, may also or alternatively be stored in the group information. Where at block 1402 shown in FIG. 25 the first mobile device processor 40 shown in FIG. 2 determines that the alert configuration record includes a rule type of "cost threshold", block 1402 may direct the first mobile device processor 40 to execute a process generally similar to that shown by flowchart 1450, except that a block similar to block 1452 may direct the first mobile device processor 40 to, when summing data counts, weight the data counts based on a cost per unit of usage. In such embodiments, a block similar to block 1452 may direct the first mobile device processor 40 to read a plan configuration record included in the group information to determine an initial cost per byte and an overage cost per byte to weight the data counts in the activity-related information by multiplying the data counts by the initial cost per byte or the overage cost per byte.

Accordingly, where at block 1402 shown in FIG. 25 the first mobile device processor 40 shown in FIG. 2 determines that the alert configuration record included a rule type of "cost threshold", the aggregation of data counts generated by the first mobile device processor 40 may represent a sum of costs associated with data use.

In various embodiments, where the alert configuration record is similar to an alert configuration record 1424 show in FIG. 29, and includes a rule type of "percentage_threshold", block 1402 shown in FIG. 25 may direct the first mobile device processor 40 to execute a process generally similar to that shown by the flowchart 1450 shown in FIG. 27, except that a block similar to block 1454 may direct the first mobile device processor 40 to determine the threshold amount as equal to a usage threshold value stored in an associated plan configuration record threshold field multiplied by the value stored in the threshold field of the alert configuration record, expressed as a percentage, which may be, by way of example only, 80%, 90%, or 95%.

Referring back to FIG. 24, after block 1302 is completed; block 1304 directs the first mobile device processor 40 to produce signals for causing the display 48 to display the derived information. As discussed above, in various embodiments the derived information may include at least one summed data count and/or alert information, for example.

Figure 30:
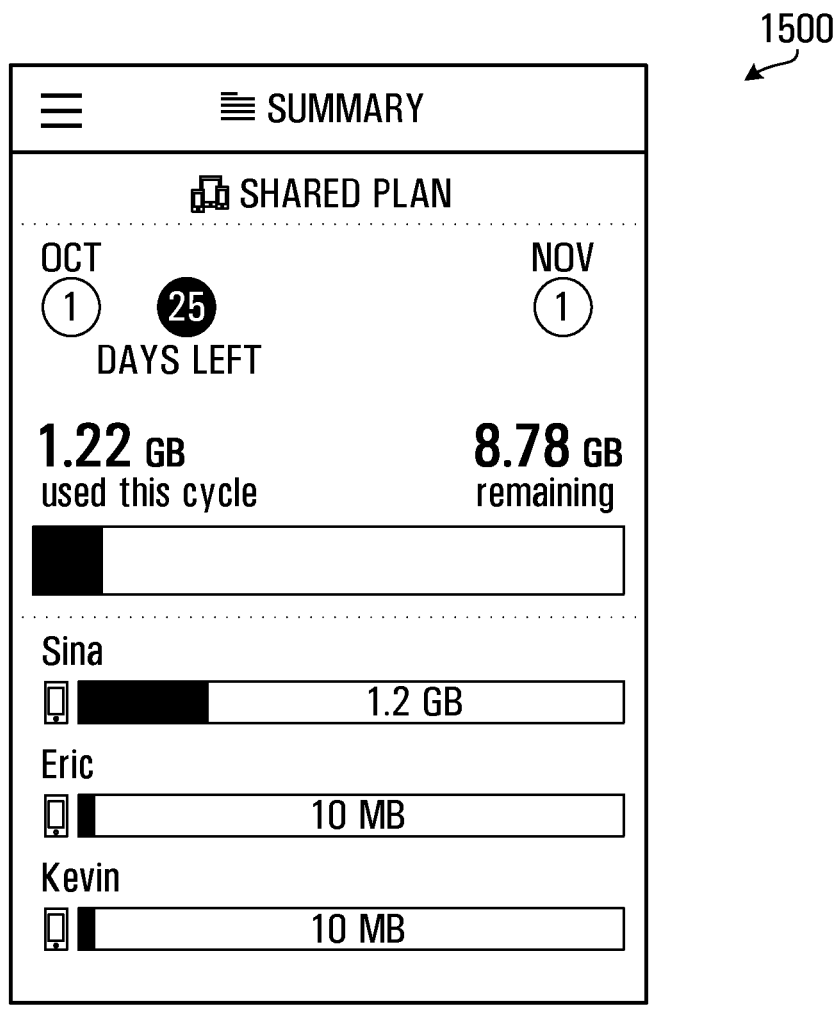
FIG. 30 is a representation of an exemplary display of derived information that may be displayed by the system shown in FIG. 1.

FIG. 30 shows an exemplary display 1500 of derived information in accordance with one embodiment, including representations of aggregations or summed data counts derived from the group activity-related information.

Figure 31:
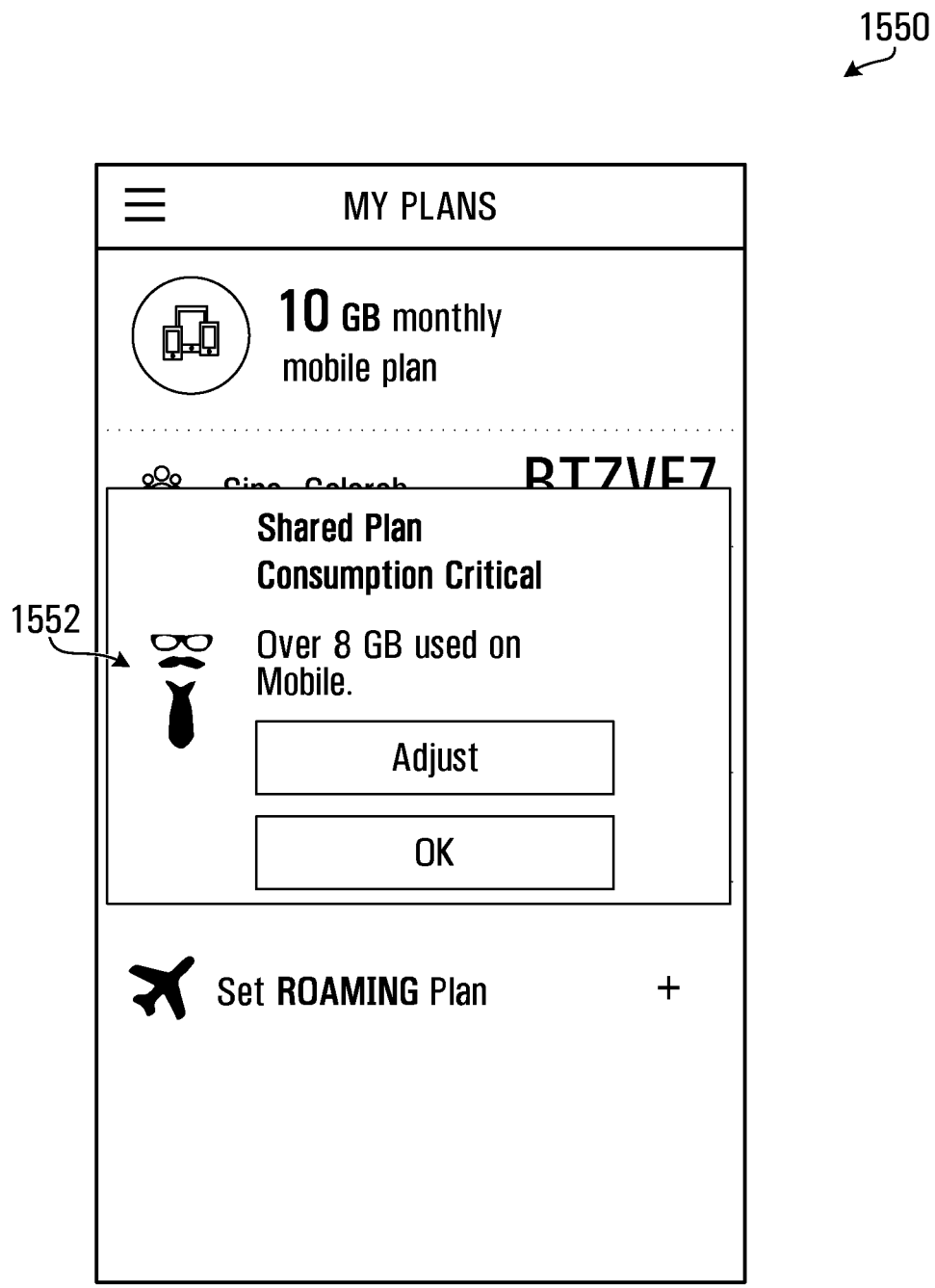
FIG. 31 is a representation of an exemplary display of derived information that may be displayed by the system shown in FIG. 1.

FIG. 31 shows an exemplary display 1550 of derived information in accordance with one embodiment that includes a representation 1552 of alert information derived from the group activity-related information.

Other Alert Configuration Records

In various embodiments, there may be various additional or alternative user definable alert configuration records that may be included in the group information stored in group information at a device, such as in the location 64 of the variable memory 44 of the first mobile device 12 shown in FIG. 2. In various embodiments, the alert configuration records may include elements or fields that may act as filters for defining various category tests that may be applied to the group activity-related information.

For example, an alert configuration record in accordance with one embodiment of the invention is shown at 1600 in FIG. 32. In the embodiment shown in FIG. 32, the alert configuration record 1600 includes a rule type of "Time_interval". A rule type of "Time_interval" may cause block 1302 to direct the first mobile device processor 40 to generate alert information periodically, regardless of the group activity-related information. In various embodiments, the alert information may include any information that may be derived from the group activity-related information as discussed above, such as for example, an aggregation or sum of data counts associated with a plan configuration.

Referring to the alert configuration record 1600 shown in FIG. 32, in various embodiments, block 1302 of FIG. 24 may direct the first mobile device processor 40 shown in FIG. 2 to read the alert configuration record 1600 and generate alert information once a month, starting with Sep. 24, 2014. Accordingly, the alert configuration record 1600 may cause an alert to be displayed once a month, one week before the end of the month. In various embodiments, for example, where a group's billing cycle ends at the end of each month, displaying alert information including an aggregation or sum of data counts one week before the end of the billing cycle may facilitate data use planning by a user or users.

Referring now to FIG. 33, an alert configuration record in accordance with one embodiment of the invention is shown at 1620. The alert configuration record 1620 includes a rule type of "location". In various embodiments, block 1402 shown in FIG. 25 may direct the first mobile device processor 40 shown in FIG. 2 to determine whether data use has taken place in a certain location, based on the alert configuration record 1620.

In various embodiments, having regard to the alert configuration record 1620, block 1402 shown in FIG. 25 may direct the first mobile device processor 40 to determine whether an activity-related information record included in the group information includes a location field that indicates that data use has taken place in a location that corresponds to a location included in the alert configuration record 1620.

Referring now to FIG. 34, an alert configuration record in accordance with one embodiment of the invention is shown at 1640. The alert configuration record 1640 includes a rule type of "Time_use". In various embodiments, block 1402 shown in FIG. 25 may direct the first mobile device processor 40 shown in FIG. 2 to determine whether data use has taken place during a certain time of day and/or by a particular user, for example, as defined by the alert configuration record 1640.

In various embodiments, block 1402 shown in FIG. 25 may direct the first mobile device processor 40 shown in FIG. 2 to read the alert configuration record 1640 and based on the elements included therein, apply a test to the group activity-related information by determining whether the group information stored in the location 64 of the variable memory 44 includes an activity-related information record associated with a user identifier of "1fb2 . . . " having a time period that falls between 18:00 and 20:00 on any day.

Such an alert configuration record may facilitate monitoring of other group member's data use. For example, in various embodiments a user who is a parent who wishes to limit their son or daughter's data use may wish to be alerted if their son or daughter uses data at a particular time of day.

In various embodiments, block 1302 shown in FIG. 24, block 1402 shown in FIG. 25, and/or block 1452 shown in FIG. 27 may direct the first mobile device processor 40 to derive information based on various alert configuration records, including alert configuration records that may include various combinations of the fields or elements described above or including other fields to cause various category tests to be applied to any or all of the information included in the group activity-related information.

Server Generating Group Activity-related Information

As described above, in various embodiments, aggregations or summed data counts and/or alert information may be generated by the first mobile device processor 40 of the first mobile device 12 shown in FIG. 2. However, in various embodiments, the aggregations or summed data counts and the alert information may also or alternatively be generated by the server 18.

Referring back to FIG. 6, in various embodiments, block 256 may direct the server processor 122 shown in FIG. 4 to aggregate or sum data counts included in the received activity-related information generally as described above having regard to block 1302 shown in FIG. 24 to generate aggregations or summed data counts. The summed data counts may, in various embodiments, be stored in the group information and may act as group activity-related information which may be sent to the at least one device by the server 18 at block 258.

Figure 35:
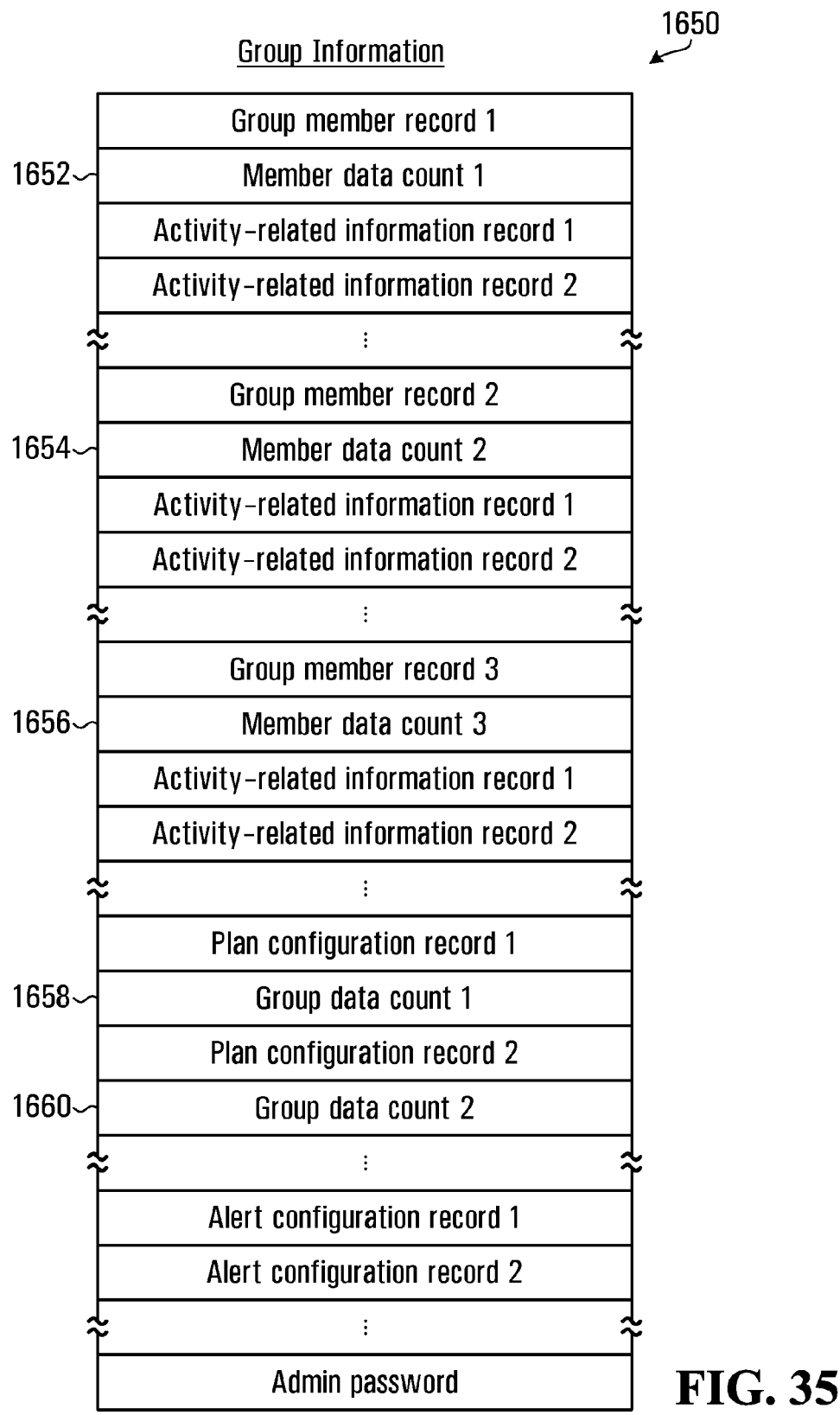
FIG. 35 is a representation of exemplary group information that may be used in the system shown in FIG. 1.

An exemplary representation of group information that may include aggregations or summed data counts is shown at 1650 in FIG. 35, which includes first, second, and third member data counts 1652, 1654, and 1656 and first and second group data counts 1658 and 1660 associated with respective plan configuration records.

In various embodiments where the server 18 generates aggregations or summed data counts, other elements of the group information, such as the individual activity-related information records, may not need to be sent to the devices at block 258 shown in FIG. 6 in order to facilitate understanding of group data use. Thus, in various embodiments, summing data counts at the server may facilitate a reduction in bandwidth use by the system and/or memory use by the devices.

In various embodiments, block 256 shown in FIG. 6 may also or alternatively direct the server processor 122 shown in FIG. 4 to determine whether the received activity-related information meets a category test and to derive alert information generally as described above having regard to blocks 1302 shown in FIG. 24 and flowcharts 1400 and 1450 shown in FIGS. 25 and 26, for example. The alert information may act as group activity-related information which may be stored in the group information and/or sent to the at least one device by the server 18 at block 258. In various embodiments, block 258 may direct the server processor 122 to send the alert information as soon as it is generated, rather than with the rest of the group information on a periodic basis.

In some embodiments, block 258 may direct the server processor to send the alert information to the at least one device according to a delivery method included in the alert configuration record (e.g. by SMS, e-mail, or push notification).

In various embodiments, block 258 shown in FIG. 6 may direct the server processor 122 shown in FIG. 4 to read the alert configuration record to determine which mobile device(s) to send the alert information to. For example, in various embodiments (not shown), the alert configuration record may include at least one recipient field for storing at least one user or device identifier and block 258 may direct the server processor 122 to send the alert information to at least one mobile device corresponding to the at least one user or device identifier stored in the recipient field. In various embodiments, where the recipient field is left blank or where there is no recipient field in the alert configuration record, block 258 may direct the server processor 122 to send the alert information to all group members.

In various embodiments, by sending the alert information, other elements of the group information, such as the activity-related information records and/or the summed data counts, may not need to be sent to the devices in order to facilitate alerting users to their group data use. Thus, in various embodiments, deriving alert information at the server 18 may facilitate a reduction in bandwidth use by the system and/or memory use by the devices.

In various embodiments, when the aggregations or summed data counts and/or the alert information act as group activity-related information, as described above, block 208 shown in FIG. 5 may direct the first mobile device processor 40 to produce signals for causing the display 48 to display representations of the aggregations or summed data counts and/or alert information. In such embodiments, the representations of the aggregations or summed data counts and/or alert information may act as information derived from the group activity-related information.

While specific embodiments of the invention have been described and illustrated, such embodiments should be considered illustrative of the invention only and not as limiting the invention as construed in accordance with the accompanying claims.

What is claimed is:

1. A method for facilitating collection and display of information related to data usage by a plurality of mobile devices, the method comprising:
receiving first activity-related information from a first mobile device of the plurality of mobile devices, the first activity-related information including a first identifier associated with the plurality of mobile devices and first quantity information representing a first quantity of data transmitted or received by the first mobile device;
receiving second activity-related information from a second mobile device of the plurality of mobile devices, the second activity-related information including a second identifier associated with the plurality of mobile devices and second quantity information representing a second quantity of data transmitted or received by the second mobile device;
receiving at least one of a first contextual information or a second contextual information, wherein the first contextual information includes signals representing a first identifier and the first activity information and the second contextual information includes signals representing a second identifier and the second activity related information;
deriving group activity-related information from at least the first activity-related information, second activity-related information, and at least one of the first contextual information or the second contextual information; and
sending the group activity-related information to at least one of the first and second mobile devices.

2. The method of claim 1 wherein the first identifier and the second identifier include a representation of a group identifier associated with the plurality of mobile devices.

3. The method of claim 1 wherein deriving the group activity-related information comprises:
determining whether the group activity-related information meets a category test;
in response to determining that the group activity-related information meets the category test, generating an alert; and
displaying the alert on a display of a mobile device amongst the plurality of mobile devices.

4. The method of claim 3 wherein determining whether the group activity-related information meets the category test comprises:
aggregating at least the first quantity information and the second quantity information included in the first activity-related information and the second activity-related information to generate an aggregation; and
determining whether the aggregation meets a threshold.

5. The method of claim 1 wherein the first contextual information or the second contextual information is sent to a server.

6. The method of claim 3 wherein the group activity-related information further includes temporal information.

7. The method of claim 6 wherein determining whether the group activity-related information meets the category test comprises:
determining whether the temporal information included in the group activity-related information falls within a time period.

8. The method of claim 3 wherein the first contextual information includes first communication type information and the second contextual information includes second communication type information.

9. The method of claim 8 wherein determining whether the group activity-related information meets the category test comprises:
determining whether at least one of the first communication type information or second communication type information corresponds to a communication type.

10. The method of claim 3 wherein the first contextual information or the second contextual information includes first application usage information and second application usage.

11. The method of claim 10 wherein determining whether the group activity-related information meets the category test comprises:
determining whether at least one of the first application usage information or the second application usage information corresponds to an application.

12. The method of claim 3 wherein the first contextual information includes first location information and the second contextual information includes second location information.

13. The method of claim 12 wherein determining whether the group activity-related information meets the category test comprises:
determining whether at least one of the first location information or the second location information included in the first activity-related information and second activity-related information corresponds to a location.

14. A non-transitory, computer program product for facilitating collection and display of information related to data usage by a plurality of mobile devices, the computer program product comprising a computer-readable storage medium containing computer program code for:
receiving first activity-related information from a first mobile device of the plurality of mobile devices, the first activity-related information including a first identifier associated with the plurality of mobile devices and first quantity information representing a first quantity of data transmitted or received by the first mobile device;
receiving second activity-related information from a second mobile device of the plurality of mobile devices, the second activity-related information including a second identifier associated with the plurality of mobile devices and second quantity information representing a second quantity of data transmitted or received by the second mobile device;
receiving at least one of a first contextual information or a second contextual information, wherein the first contextual information includes signals representing a first identifier and the first activity information and the second contextual information includes signals representing a second identifier and the second activity related information;

deriving group activity-related information from at least the first activity-related information, second activity-related information, and at least one of the first contextual information or the second contextual information; and sending the group activity-related information to at least one of the first and second mobile devices.

15. The non-transitory, computer program product of claim 14 wherein the first identifier and the second identifier include a representation of a group identifier associated with the plurality of mobile devices.

16. The non-transitory, computer program product of claim 14 wherein deriving the group activity-related information comprises:

determining whether the group activity-related information meets a category test;

in response to determining that the group activity-related information meets the category test, generating an alert; and displaying the alert on a display of a mobile device amongst the plurality of mobile devices.

17. The non-transitory, computer program product of claim 16 wherein determining whether the group activity-related information meets the category test comprises:

aggregating at least the first quantity information and the second quantity information included in the first activity-related information and the second activity-related information to generate an aggregation; and determining whether the aggregation meets a threshold.

18. The non-transitory, computer program product of claim 14 wherein the first contextual information or the second contextual information is sent to a server.

19. The non-transitory, computer program product of claim 16 wherein the group activity-related information further includes temporal information.

20. The non-transitory, computer program product of claim 19 wherein determining whether the group activity-related information meets the category test comprises:

determining whether the temporal information included in the group activity-related information falls within a time period.

21. The non-transitory, computer program product of claim 16 wherein the first contextual information includes first communication type information and the second contextual information includes second communication type information.

22. The non-transitory, computer program product of claim 21 wherein determining whether the group activity-related information meets the category test comprises:

determining whether at least one of the first communication type information or second communication type information corresponds to a communication type.

23. The non-transitory, computer program product of claim 16 wherein the first contextual information or the second contextual information includes first application usage information and second application usage.

24. The non-transitory, computer program product of claim 23 wherein determining whether the group activity-related information meets the category test comprises:

determining whether at least one of the first application usage information or the second application usage information corresponds to an application.

25. The non-transitory, computer program product of claim 16 wherein the first contextual information includes first location information and the second contextual information includes second location information.

26. The non-transitory, computer program product of claim 25 wherein determining whether the group activity-related information meets the category test comprises:

determining whether at least one of the first location information or the second location information included in the first activity-related information and second activity-related information corresponds to a location.

\* \* \* \* \*